(12) United States Patent
Lei et al.

(10) Patent No.: US 11,089,598 B2
(45) Date of Patent: Aug. 10, 2021

(54) MULTIPLE ACCESS SIGNATURES FOR NON-ORTHOGONAL MULTIPLE ACCESS (NOMA) WIRELESS COMMUNICATIONS

(71) Applicant: QUALCOMM Incorporated, San Diego, CA (US)

(72) Inventors: Jing Lei, San Diego, CA (US); Gabi Sarkis, San Diego, CA (US); Joseph Binamira Soriaga, San Diego, CA (US); Wanshi Chen, San Diego, CA (US); Seyong Park, San Diego, CA (US); Ying Wang, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/546,140

(22) Filed: Aug. 20, 2019

(65) Prior Publication Data

US 2020/0077402 A1   Mar. 5, 2020

Related U.S. Application Data

(60) Provisional application No. 62/725,207, filed on Aug. 30, 2018.

(51) Int. Cl.
*H04W 72/04* (2009.01)
*H04L 5/10* (2006.01)
(Continued)

(52) U.S. Cl.
CPC ....... *H04W 72/0466* (2013.01); *H04L 1/0003* (2013.01); *H04L 5/0051* (2013.01);
(Continued)

(58) Field of Classification Search
CPC .............. H04W 72/0466; H04W 76/27; H04L 1/0003; H04L 1/0045; H04L 1/0041; H04L 5/0037; H04L 5/0021; H04J 11/00
See application file for complete search history.

(56) References Cited

U.S. PATENT DOCUMENTS 10,848,260 B2 * 11/2020 Yoshimoto ........... H04J 11/0079
2018/0310321 A1 * 10/2018 Basu Mallick ..... H04W 72/085
(Continued)

FOREIGN PATENT DOCUMENTS

WO    WO-2017139005 A1    8/2017

OTHER PUBLICATIONS

International Search Report and Written Opinion—PCT/US2019/047481—ISA/EPO—dated Jan. 31, 2020.
(Continued)

*Primary Examiner* — Fahmida S Chowdhury
(74) *Attorney, Agent, or Firm* — Holland & Hart LLP; Nerrie M. Zohn

(57) ABSTRACT

Methods, systems, and devices for wireless communications are described in which multiple access (MA) signatures may be used in non-orthogonal multiple access (NOMA) transmissions to provide differentiation between multiple concurrent NOMA transmission that use common time, frequency, and spatial resources. Systematic extension of the pool size of MA signatures can be obtained by the grouping of UE-specific spreading codes and the application of group-specific scrambling code, where the generation of scrambling code can depend at least on a cell ID and UE group ID. The MA signature may be based at least in part on a UE specific spreading code and a group level scrambling code. The UE-specific spreading code may be one of a set of codes associated with a particular scrambling code. The scrambling code may be one of a number of orthogonal or
(Continued)

non-orthogonal scrambling codes that are associated with one or more UE parameters.

20 Claims, 20 Drawing Sheets

(51) Int. Cl.
    *H04L 1/00*         (2006.01)
    *H04W 76/27*     (2018.01)
    *H04L 5/00*         (2006.01)

(52) U.S. Cl.
    CPC ............. *H04L 5/10* (2013.01); *H04W 72/042* (2013.01); *H04W 76/27* (2018.02)

(56) References Cited

U.S. PATENT DOCUMENTS

| | | | | |
|---|---|---|---|---|
| 2018/0337816 | A1* | 11/2018 | Herath | H04L 1/0075 |
| 2019/0029031 | A1* | 1/2019 | Kumar | H04W 28/0278 |
| 2019/0132870 | A1* | 5/2019 | Guey | H04W 74/085 |
| 2019/0245640 | A1* | 8/2019 | Yoshimoto | H04L 5/0053 |
| 2019/0288794 | A1* | 9/2019 | Yamada | H04W 72/02 |
| 2019/0306840 | A1* | 10/2019 | Taherzadeh Boroujeni | H04L 5/0053 |
| 2019/0349148 | A1* | 11/2019 | Nammi | H04L 5/0051 |
| 2020/0008221 | A1* | 1/2020 | Keating | H04W 72/042 |
| 2020/0053789 | A1* | 2/2020 | Lee | H04W 74/004 |
| 2020/0146032 | A1* | 5/2020 | Bae | H04L 1/08 |
| 2020/0322973 | A1* | 10/2020 | Li | H04W 72/1268 |
| 2020/0337068 | A1* | 10/2020 | Yi | H04L 1/0003 |
| 2021/0083818 | A1* | 3/2021 | Mu | H04B 1/707 |

OTHER PUBLICATIONS

Partial International Search Report—PCT/US2019/047481—ISA/EPO—dated Nov. 28, 2019.

* cited by examiner

MULTIPLE ACCESS SIGNATURES FOR NON-ORTHOGONAL MULTIPLE ACCESS (NOMA) WIRELESS COMMUNICATIONS

CROSS REFERENCE

The present application for patent claims the benefit of U.S. Provisional Patent Application No. 62/725,207 by LEI, et al., entitled "MULTIPLE ACCESS SIGNATURES FOR NON-ORTHOGONAL MULTIPLE ACCESS (NOMA) WIRELESS COMMUNICATIONS," filed Aug. 30, 2018, assigned to the assignee hereof, and expressly incorporated herein.

BACKGROUND

The following relates generally to wireless communications, and more specifically to multiple access signatures for non-orthogonal multiple access (NOMA) wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support multiple access techniques for multiple users by sharing available system resources (e.g., time, frequency, and power). In some cases, non-orthogonal multiple access (NOMA) techniques may outperform orthogonal multiple access (OMA) techniques, and may allow multiple different transmitters to transmit concurrent transmissions over common time, frequency, and spatial resources. NOMA techniques may enable access to more system bandwidth for transmitting devices (e.g., a UE), while simultaneously enabling a greater number of users to communicate on a set of time frequency resources. Enhanced efficiency and reliability of NOMA communications may help to enhance performance of wireless communications systems.

SUMMARY

The described techniques relate to improved methods, systems, devices, and apparatuses that support multiple access signatures for non-orthogonal multiple access (NOMA) wireless communications. In various aspects, multiple access (MA) signatures may be used by a transmitter, such as a user equipment (UE), in a transmission to a receiver, such as a base station. The base station may receive multiple concurrent transmissions from multiple different UEs, and the MA signature applied to each of the multiple concurrent transmissions helps to identify a particular UE of the multiple UEs associated with a received communication. Further, in some cases each UE may have multiple NOMA transmission branches or layers that are available for multiple concurrent NOMA transmissions from a respective UE, and the MA signature may be used to help decoding of such multi-layer NOMA transmissions. Systematic extension of the pool size of MA signatures may be obtained by the grouping of UE-specific spreading codes and the application of group-specific scrambling code, where the generation of scrambling code can in some cases depend at least on a cell ID and UE group ID.

In some cases, data traffic that is to be transmitted by the UE (e.g., in either a RRC_CONNECTED mode or RRC_INACTIVE mode) may apply an MA signature that is based at least in part on a UE-specific spreading code and a scrambling code. The UE-specific spreading code may be applied, in some cases, to each layer of a multi-layer NOMA transmission, and may be one of a set of codes associated with a particular scrambling code that may be used by a group of UEs. The scrambling code may be one of a number of scrambling codes that are associated with one or more UE parameters (e.g., transport block size (TBS), BWP index, transmission power control scheme, modulation and coding scheme (MCS), UE buffer size, power head room, or combinations thereof) and applied to a superimposed multi-layer NOMA signal. In some cases, the UE-specific spreading code and the scrambling code may both be applied to a superimposed multi-layer NOMA signal. The UE-specific spreading codes within each set of spreading codes may be orthogonal or non-orthogonal (e.g., based on a level of cross-correlation between spreading codes within the set). In some cases, one or more sets of spreading codes may include a hybrid mix of orthogonal and non-orthogonal spreading codes.

A method of wireless communication at a UE is described. The method may include determining a multiple access signature to be applied to an uplink NOMA communication to a base station, where the multiple access signature is based on a UE-specific spreading code and a scrambling code associated with a first group of UEs, applying the multiple access signature to the uplink NOMA communication, and transmitting the uplink NOMA communication to the base station.

An apparatus for wireless communication at a UE is described. The apparatus may include a processor, memory in electronic communication with the processor, and instructions stored in the memory. The instructions may be executable by the processor to cause the apparatus to determine a multiple access signature to be applied to an uplink NOMA communication to a base station, where the multiple access signature is based on a UE-specific spreading code and a scrambling code associated with a first group of UEs, apply the multiple access signature to the uplink NOMA communication, and transmit the uplink NOMA communication to the base station.

Another apparatus for wireless communication at a UE is described. The apparatus may include means for determining a multiple access signature to be applied to an uplink NOMA communication to a base station, where the multiple access signature is based on a UE-specific spreading code and a scrambling code associated with a first group of UEs, applying the multiple access signature to the uplink NOMA communication, and transmitting the uplink NOMA communication to the base station.

A non-transitory computer-readable medium storing code for wireless communication at a UE is described. The code may include instructions executable by a processor to determine a multiple access signature to be applied to an uplink NOMA communication to a base station, where the multiple access signature is based on a UE-specific spreading code and a scrambling code associated with a first group of UEs, apply the multiple access signature to the uplink NOMA communication, and transmit the uplink NOMA communication to the base station.

In some examples of the method, apparatuses, and non-transitory computer-readable medium described herein, the UE-specific spreading code may be one of a set of orthogonal UE-specific spreading codes. In some examples of the method, apparatuses, and non-transitory computer-readable medium described herein, a cross-correlation between different UE-specific spreading codes of the set of orthogonal UE-specific spreading codes may be below a threshold value. In some examples of the method, apparatuses, and non-transitory computer-readable medium described herein, the UE-specific spreading code may be one of a set of UE-specific spreading codes in which at least a subset of the UE-specific spreading codes may be non-orthogonal to other UE-specific spreading codes of the set of UE-specific spreading codes.

Some examples of the method, apparatuses, and non-transitory computer-readable medium described herein may further include operations, features, means, or instructions for receiving multiple access signature configuration information from the base station that indicates the UE-specific spreading code and the scrambling code associated with the first group of UEs. In some examples of the method, apparatuses, and non-transitory computer-readable medium described herein, the multiple access signature configuration information may be received from the base station in a master information block (MIB), in a SIB, in remaining minimum system information (RMSI), in a group common PDCCH, in RRC signaling, in dynamic DCI associated with the uplink NOMA communication, or any combination thereof.

In some examples of the method, apparatuses, and non-transitory computer-readable medium described herein, the applying the multiple access signature to the uplink NOMA communication may include operations, features, means, or instructions for applying the multiple access signature to a preamble to be included with the uplink NOMA communication. In some examples of the method, apparatuses, and non-transitory computer-readable medium described herein, the applying the multiple access signature to the uplink NOMA communication may include operations, features, means, or instructions for applying the multiple access signature to PUSCH data to be included with the uplink NOMA communication and applying a demodulation reference signal (DMRS) signature to a DMRS to be included with the uplink NOMA communication. In some examples of the method, apparatuses, and non-transitory computer-readable medium described herein, the DMRS signature includes an orthogonal cover code (OCC) or quasi-orthogonal cover code and a group scrambling or short spreading code that may be applied to a base DMRS sequence. In some examples of the method, apparatuses, and non-transitory computer-readable medium described herein, the multiple access signature applied to PUSCH data includes a short spreading code and a group-specific scrambling code, and where the short spreading code may be jointly configured for both the PUSCH data and the base DMRS sequence.

In some examples of the method, apparatuses, and non-transitory computer-readable medium described herein, a mapping between the multiple access signature and the DMRS signature may be provided in multiple access signature configuration information provided by the base station. In some examples of the method, apparatuses, and non-transitory computer-readable medium described herein, the applying the multiple access signature to the uplink NOMA communication may include operations, features, means, or instructions for applying the UE-specific spreading code or permutation pattern to each layer of a multi-layer NOMA uplink communication, superimposing each layer of the multi-layer NOMA uplink communication to generate a superimposed NOMA uplink signal and applying the scrambling code to the superimposed NOMA uplink signal. In some examples of the method, apparatuses, and non-transitory computer-readable medium described herein, the applying the multiple access signature to the uplink NOMA communication may include operations, features, means, or instructions for superimposing each of a set of layers of a multi-layer NOMA uplink communication to generate a superimposed NOMA uplink signal, applying the UE-specific spreading code to the superimposed NOMA uplink signal to generate a spread superimposed NOMA uplink signal and applying the scrambling code to the spread superimposed NOMA uplink signal.

In some examples of the method, apparatuses, and non-transitory computer-readable medium described herein, the UE-specific spreading code may be determined from a set of available spreading codes, the set of available spreading codes corresponding to a spreading factor and a number of distinct spreading codes. Some examples of the method, apparatuses, and non-transitory computer-readable medium described herein may further include operations, features, means, or instructions for identifying a set of codebooks that each include a set of UE-specific spreading codes, each of the set of codebooks associated with a different group of UEs of a set of groups of UEs, selecting the first group of UEs from the set of groups of UEs based on one or more of an amount of data to be transmitted in the uplink NOMA communication, a transmission power for the uplink NOMA communication, a spreading factor to be used for the UE-specific spreading codes, or a modulation and coding scheme (MCS) to be used for the uplink NOMA communication and selecting a first codebook of the set of codebooks that may be associated with the first group of UEs. Some examples of the method, apparatuses, and non-transitory computer-readable medium described herein may further include operations, features, means, or instructions for selecting the UE-specific spreading code from the first codebook based on a UE identification or an index value assigned to the UE by the base station.

In some examples of the method, apparatuses, and non-transitory computer-readable medium described herein, the set of UE-specific spreading codes of each of the set of codebooks include modified chirp sequences (MCPs), computer generated sequences (CGSs), pseudo-random noise (PN) sequences, or combinations thereof. In some examples of the method, apparatuses, and non-transitory computer-readable medium described herein, the set of UE-specific spreading codes of each of the set of codebooks include orthogonal spreading codes, non-orthogonal spreading codes, or a hybrid of orthogonal spreading codes and non-orthogonal spreading codes. In some examples of the method, apparatuses, and non-transitory computer-readable medium described herein, the set of codebooks include two or more codebooks that may be each associated with different numbers of UEs, different spreading factors for associated UE-specific spreading codes, different types of UE-specific spreading codes, or combinations thereof.

A method of wireless communication at a base station is described. The method may include identifying a set of UEs configured for concurrent uplink NOMA communications, transmitting, to the set of UEs, an indication of a multiple access signature to be applied to uplink NOMA communications of each UE of the set of UEs, where the multiple access signature for each UE is based on a UE-specific spreading code and a scrambling code associated with a group of UEs, receiving at least two concurrent uplink NOMA communications from at least two UEs of the set of UEs using a common set of uplink resources, and determining each UE of the set of UEs that transmitted each of the at least two concurrent uplink NOMA communications, based on multiple access signatures that are applied to each of the concurrent uplink NOMA communications.

An apparatus for wireless communication at a base station is described. The apparatus may include a processor, memory in electronic communication with the processor, and instructions stored in the memory. The instructions may be executable by the processor to cause the apparatus to identify a set of UEs configured for concurrent uplink NOMA communications, transmit, to the set of UEs, an indication of a multiple access signature to be applied to uplink NOMA communications of each UE of the set of UEs, where the multiple access signature for each UE is based on a UE-specific spreading code and a scrambling code associated with a group of UEs, receive at least two concurrent uplink NOMA communications from at least two UEs of the set of UEs using a common set of uplink resources, and determine each UE of the set of UEs that transmitted each of the at least two concurrent uplink NOMA communications, based on multiple access signatures that are applied to each of the concurrent uplink NOMA communications.

Another apparatus for wireless communication at a base station is described. The apparatus may include means for identifying a set of UEs configured for concurrent uplink NOMA communications, transmitting, to the set of UEs, an indication of a multiple access signature to be applied to uplink NOMA communications of each UE of the set of UEs, where the multiple access signature for each UE is based on a UE-specific spreading code and a scrambling code associated with a group of UEs, receiving at least two concurrent uplink NOMA communications from at least two UEs of the set of UEs using a common set of uplink resources, and determining each UE of the set of UEs that transmitted each of the at least two concurrent uplink NOMA communications, based on multiple access signatures that are applied to each of the concurrent uplink NOMA communications.

A non-transitory computer-readable medium storing code for wireless communication at a base station is described. The code may include instructions executable by a processor to identify a set of UEs configured for concurrent uplink NOMA communications, transmit, to the set of UEs, an indication of a multiple access signature to be applied to uplink NOMA communications of each UE of the set of UEs, where the multiple access signature for each UE is based on a UE-specific spreading code and a scrambling code associated with a group of UEs, receive at least two concurrent uplink NOMA communications from at least two UEs of the set of UEs using a common set of uplink resources, and determine each UE of the set of UEs that transmitted each of the at least two concurrent uplink NOMA communications, based on multiple access signatures that are applied to each of the concurrent uplink NOMA communications.

In some examples of the method, apparatuses, and non-transitory computer-readable medium described herein, the UE-specific spreading code of each UE of the set of UEs may be one of a set of orthogonal UE-specific spreading codes associated with each of a set of groups of UEs. In some examples of the method, apparatuses, and non-transitory computer-readable medium described herein, a cross-correlation between different UE-specific spreading codes of the set of orthogonal UE-specific spreading codes may be below a threshold value. In some examples of the method, apparatuses, and non-transitory computer-readable medium described herein, the UE-specific spreading code of each UE of the set of UEs may be one of a set of UE-specific spreading codes in which at least a subset of the UE-specific spreading codes may be non-orthogonal to other UE-specific spreading codes of the set of UE-specific spreading codes. In some examples of the method, apparatuses, and non-transitory computer-readable medium described herein, the indication of the multiple access signature to be applied to uplink NOMA communications of each UE of the set of UEs may be transmitted in a master information block (MIB), in a SIB, in remaining minimum system information (RMSI), in a group common PDCCH, in RRC signaling to each of the set of UEs, in dynamic DCI signaling to each of the set of UEs, or any combination thereof.

In some examples of the method, apparatuses, and non-transitory computer-readable medium described herein, the multiple access signature may be applied to a preamble that is included with the uplink NOMA communication In some examples of the method, apparatuses, and non-transitory computer-readable medium described herein, the multiple access signatures that may be applied to each of the concurrent uplink NOMA communications may be applied to PUSCH data included with the uplink NOMA communication, and where a demodulation reference signal (DMRS) signature may be applied to a DMRS that may be transmitted with the uplink NOMA communication. In some examples of the method, apparatuses, and non-transitory computer-readable medium described herein, the DMRS signature includes an orthogonal cover code (OCC) or quasi-orthogonal cover code and a group scrambling or short spreading code that may be applied to a base DMRS sequence. In some examples of the method, apparatuses, and non-transitory computer-readable medium described herein, a mapping between the multiple access signature and the DMRS signature may be provided in multiple access signature configuration information. In some examples of the method, apparatuses, and non-transitory computer-readable medium described herein, the UE-specific spreading codes of each of the set of UEs may be determined from a set of available spreading codes based on a spreading factor and a number of distinct spreading codes.

Some examples of the method, apparatuses, and non-transitory computer-readable medium described herein may further include operations, features, means, or instructions for transmitting information associated with a set of codebooks to each of the set of UEs, where each of the set of codebooks include a set of UE-specific spreading codes, and each of the set of codebooks may be associated with one or more of an amount of data to be transmitted by a UE in an associated uplink NOMA communication, a transmission power of the UE, a spreading factor to be used for the UE-specific spreading codes, or a modulation and coding scheme (MC S) to be used by the UE. In some examples of the method, apparatuses, and non-transitory computer-readable medium described herein, the UE-specific spreading code of each of the set of codebooks may be based on a UE identification or an index value assigned to the UE. In some examples of the method, apparatuses, and non-transitory computer-readable medium described herein, the set of UE-specific spreading codes of each of the set of codebooks include modified chirp sequences (MCPs), computer generated sequences (CGSs), pseudo-random noise (PN) sequences, or combinations thereof. In some examples of the method, apparatuses, and non-transitory computer-readable medium described herein, the set of UE-specific spreading codes of each of the set of codebooks include orthogonal spreading codes, non-orthogonal spreading codes, or a hybrid of orthogonal spreading codes and non-orthogonal spreading codes. In some examples of the method, apparatuses, and non-transitory computer-readable medium described herein, the set of codebooks include two or more codebooks that may be each associated with different numbers of UEs, different spreading factors for associated UE-specific spreading codes, different types of UE-specific spreading codes, or combinations thereof.

DETAILED DESCRIPTION

Figure 1:
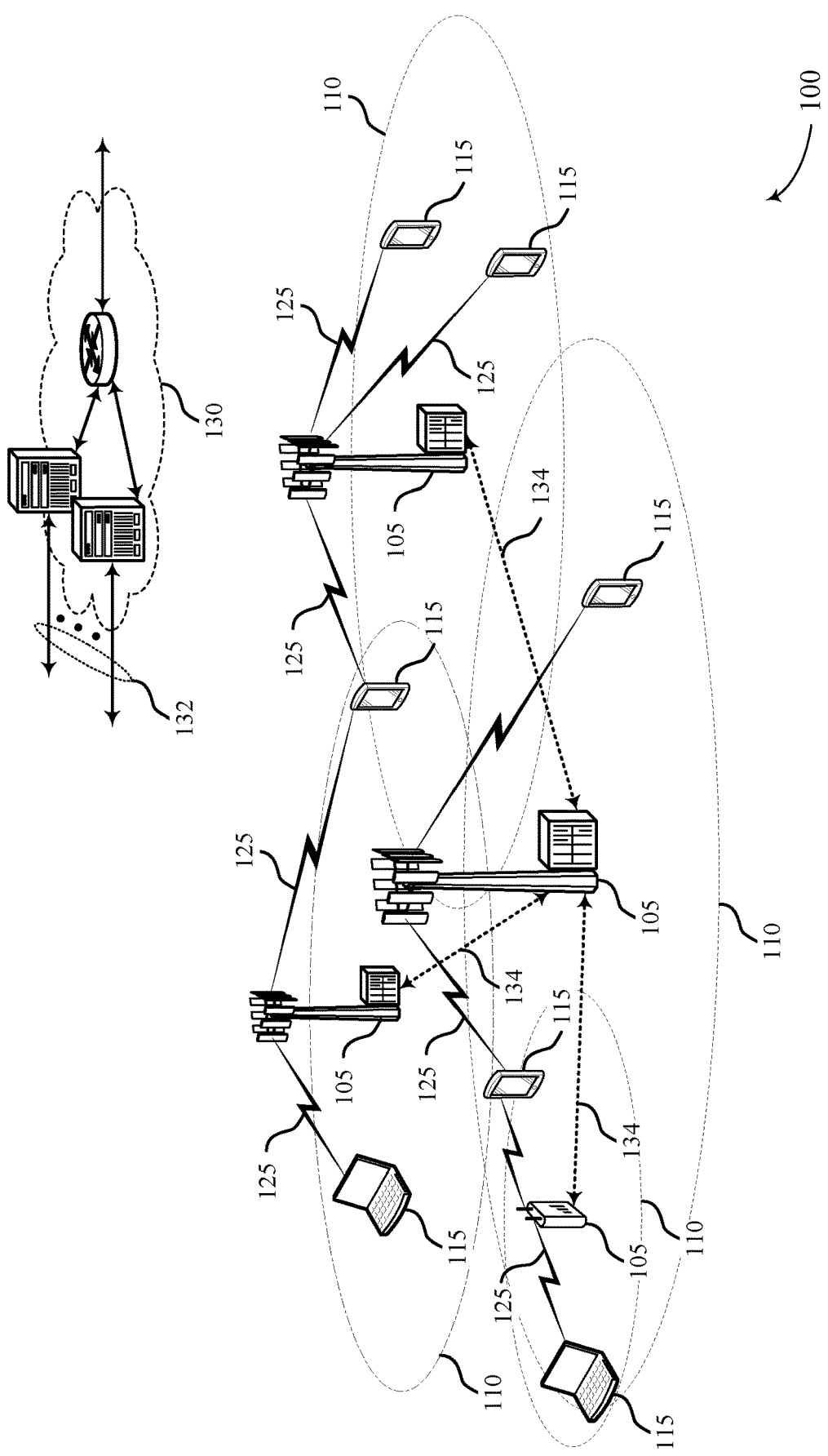
FIG. 1 illustrates an example of a system for wireless communications that supports multiple access signatures for non-orthogonal multiple access (NOMA) wireless communications in accordance with aspects of the present disclosure.

Some wireless communications systems may support multiple access techniques for multiple users by sharing available system resources (e.g., time, frequency, and spatial resources). Such multiple access techniques may include non-orthogonal multiple access (NOMA) techniques that enhance achievable spectral efficiency (SE) in a system and may outperform orthogonal multiple access (OMA) techniques, by allowing multiple different concurrent transmissions over common time, frequency, and spatial resources.

As discussed herein, various techniques support multiple access (MA) signatures for use by a NOMA transmitter, such as a user equipment (UE). A receiver, such as a base station may receive multiple concurrent transmissions from multiple different UEs, and the MA signature applied to each of the multiple concurrent transmissions may help to identify a particular UE from the multiple UEs that had concurrent transmissions to the base station. In some cases, the MA signature may be based at least in part on a UE-specific spreading code and a scrambling code. The UE-specific spreading code may be applied, in some cases, to each layer of a multi-layer NOMA transmission, and may be one of a set of codes associated with a particular scrambling code that may be used by a group of UEs. The scrambling code may be one of a number of scrambling codes that are associated with one or more UE parameters (e.g., transport block size (TB S), bandwidth part (BWP) index, transmission power control scheme, modulation and coding scheme (MCS), UE buffer size, power head room, or combinations thereof) and applied to a superimposed multi-layer NOMA signal. In some cases, the UE-specific spreading code and the scrambling code may both be applied to a superimposed multi-layer NOMA signal. The UE-specific spreading codes within each set of spreading codes may be orthogonal or non-orthogonal (e.g., based on a level of cross-correlation between spreading codes within the set). In some cases, one or more sets of spreading codes may include a hybrid mix of orthogonal and non-orthogonal spreading codes. Spreading and scrambling of NOMA signals may be performed at the symbol level (e.g., rather than at a bit-level), which may allow for enhanced backward compatibility and also for reduced hardware complexity.

A base station or other receiver that receives multiple concurrent NOMA transmissions on common time, frequency, and spatial resources may demodulate and decode such transmissions according to NOMA techniques that enable the recovery of multiple simultaneous transmissions. Such NOMA techniques include, for example, successive interference cancelation (SIC), multi-user decoders (MUDs), resource spread multiple access (RSMA), or combinations thereof. A MUD may use SIC techniques to decode a first, relatively strong, signal from a first transmitter, subtract the first signal from the received signal, decode a second signal from a second transmitter, and so on. RSMA techniques may utilize lower rate channel coding that spreads a transmitted signal across resources. Gains obtained from the channel coding may lead to robust transmissions, and also may be well suited for sporadic transmissions of small non-orthogonal data bursts. For example, RSMA techniques may be beneficial in systems that support machine type communication (MTC), enhanced MTC (eMTC), massive MTC (mMTC) communications, narrowband Internet of Things (NB-IoT) communications, ultra-reliable low latency communications (URLLC), enhanced mobile broadband (eMBB), and the like. In such cases, signals from multiple transmitting devices may be recovered simultaneously, even in the presence of mutual interference.

As described herein, through the use of NOMA techniques, greater power savings, signaling overhead reduction and configuration flexibility may be provided for multiple access by a large number of UEs (e.g., for mMTC systems), while also supporting robust communications with varying channel code rates. Various of the NOMA techniques may use a spreading code in conjunction with a scrambling code and resource element (RE) mapping to spread and scramble transmissions of different NOMA layers and which may help provide more reliable decoding to multiple different concurrently transmitted NOMA layers. In some examples, certain wireless resources may be made available for NOMA transmissions in a grant-free configuration (e.g., periodic subframes or slots within a set of time resources may be available for NOMA transmissions), which may enhance system efficiency and capacity by reducing overhead associated with scheduling requests and specific grants that may otherwise be communicated between a UE and a base station. Additionally, such reduced signaling may reduce power consumption and latency of a system.

Aspects of the disclosure are initially described in the context of a wireless communications system. Aspects of the disclosure are further illustrated by and described with reference to apparatus diagrams, process flows, system diagrams, and flowcharts that relate to multiple access signatures for NOMA wireless communications.

FIG. 1 illustrates an example of a wireless communications system 100 that supports multiple access signatures for NOMA wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may communicate using NOMA transmissions in which multiple UEs 115 may concurrently transmit uplink communications to a base station 105 using common time, frequency, and spatial resources.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling or pre-configuration of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, one or more UEs 115 may be configured for NOMA transmissions, and may be configured with multiple NOMA transmission layers that are available for one or more concurrent NOMA transmissions. In some cases, such UEs 115 may apply a MA signature to an uplink NOMA transmission, which may be based on a UE-specific spreading code and a scrambling code. In some cases, a set of spreading codes may be associated with a scrambling code, and UEs 115 may be grouped by scrambling codes based on one or more parameters of the UE 115 (e.g., transport block size (TBS), transmission power, modulation and coding scheme (MCS), UE buffer size, or combinations thereof). Such a UE 115 may determine a scrambling code for a NOMA transmission, and then the UE-specific spreading code may be one of the set of spreading codes associated with the scrambling code.

A base station 105 may receive multiple concurrent transmissions from multiple different UEs 115, and use the MA signature applied to each of the multiple concurrent transmissions in to help identify a particular UE 115 of the multiple UEs 115 that had concurrent transmissions to the base station 105. The UE-specific spreading code may be applied, in some cases, to each layer of a multi-layer NOMA transmission. In some cases, the UE-specific spreading code and the scrambling code may both be applied to a superimposed multi-layer NOMA signal. The UE-specific spreading codes within each set of spreading codes may be orthogonal or non-orthogonal (e.g., based on a level of cross-correlation between spreading codes within the set). In some cases, one or more sets of spreading codes may include a hybrid mix of orthogonal and non-orthogonal spreading codes.

Figure 2:
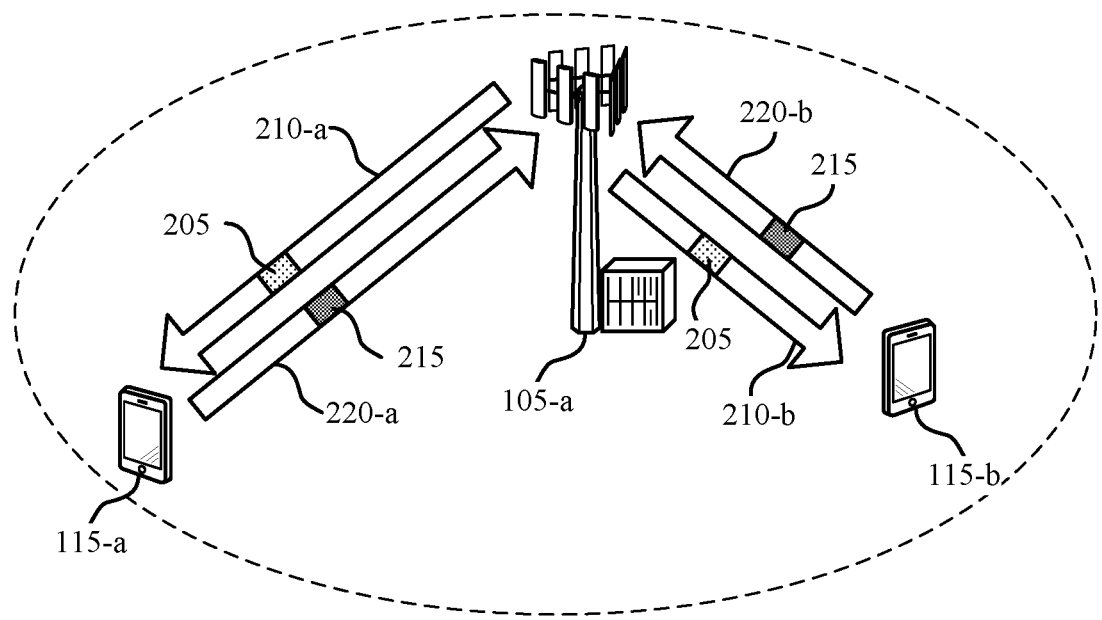
FIG. 2 illustrates an example of a wireless communications system that supports multiple access signatures for NOMA wireless communications in accordance with aspects of the present disclosure.

FIG. 2 illustrates an example of a wireless communications system 200 that supports multiple access signatures for NOMA wireless communications in accordance with aspects of the present disclosure. In some examples, wireless communications system 200 may implement aspects of wireless communications system 100. In the example of FIG. 2, the wireless communications system 200 may include base station 105-a, which may be an example of a base station 105 of FIG. 1. The wireless communications system 200 may also include first UE 115-a and second UE 115-b, which may each be examples of a UE 115 of FIG. 1, that are located within coverage area 110-a of base station 105-a.

The UEs 115 may be configured for NOMA transmissions that may use one or more NOMA transmission branches (e.g., according to multi-layer (ML) RSMA transmission techniques). For example, UEs 115 may receive NOMA configuration information 205, via downlink carriers 210 and may transmit concurrent NOMA uplink transmissions 215 using common NOMA uplink resources via uplink carriers 220. In some cases, NOMA uplink transmissions 215 may allow the UEs 115 to autonomously transmit uplink transmissions in the absence of a specific grant of uplink resources to the UE 115 (i.e., in grant-free transmissions). Such grant-free uplink transmissions may significantly reduce downlink overhead of the wireless communications system 200. For example, grant-based uplink transmissions may consume one downlink grant, which indicates uplink resources for the uplink transmission. In some deployments, a majority of uplink transmission (e.g., greater than 90% in some deployments) transmit a relatively small amount of data (e.g., 40 bytes or less), and thus the downlink grants consume a relatively large amount of network resources relative to the uplink data transmissions. Further, as the number of UEs 115 in a system increase (e.g., in some IoT deployments numerous UEs 115 may be present in a coverage area of base station 105-a) and relatively small amounts of data are transmitted in uplink transmissions, the overhead of downlink control information (DCI) that provides grants for the uplink traffic may also increase. Thus, NOMA techniques may allow concurrent transmissions from UEs 115, and may allow the UEs 115 to transmit NOMA uplink transmissions 215 in the absence of an uplink grant, and may thus increase network efficiency. Further, spectral efficiency may be further increased by using multiple NOMA transmission branches, and various techniques provided herein may allow a UE 115 to apply a MA signature to a NOMA transmission to enhance reliability and increase the likelihood of successful decoding of the NOMA transmission at the base station 105-a.

In some cases, each of the UEs 115 may transmit concurrent uplink transmissions via the same uplink resources that are each based on a MA signature. NOMA processing may be performed in each of the UEs 115 to apply the MA signature, which may include spreading and scrambling of multiple symbols of NOMA data, and mapping of symbols to REs for wireless transmission. In some cases, MA signatures used by each UE 115 may have desired cross-correlation properties that provide for enhanced differentiation of transmissions from different UEs 115 at the base station 105-a. In some cases, physical uplink shared channel (PUSCH) data transmissions may have MA signatures that are jointly represented by a symbol-level short spreading code and a group/cell specific scrambling code.

Further, in some cases, demodulation reference signal (DMRS) transmissions may have MA signatures that are jointly represented by an orthogonal cover code (OCC) sequence (or quasi-orthogonal cover code) applied to a base DMRS sequence which may have a cyclic shift, and group/cell specific scrambling code. In some cases, mapping rules may be provided for UE grouping between DMRS and PUSCH MA signatures, where different UE group may be mapped to, for example, different TBSs, different spreading factors, different transmission powers, different MCSs, different buffer states, or combinations thereof. For example, UEs 115 having a TBS within a certain range may be mapped to a first group-specific scrambling code, which may have a set of associated UE-specific spreading codes. A UE 115 may determine the scrambling code for use in a NOMA uplink transmission, and a UE-specific spreading code of the set of associated UE-specific spreading codes (e.g., based on a UE identification, an index value provided to the UE, or a preconfigured or semi-static UE-specific spreading code within the set). In some cases, UE-specific spreading codes within each set of UE-specific spreading codes may be orthogonal (e.g., based on a cross-correlation of spreading codes within the set being below a threshold value), non-orthogonal, or a hybrid of orthogonal and non-orthogonal short spreading codes.

The base station 105-a may receive such NOMA transmissions, may demap the received transmissions to determine the transmissions of each NOMA transmission layer, and may then demodulate and decode each of the NOMA transmission layers based at least in part on the MA signature applied to each NOMA transmission.

Figure 3:
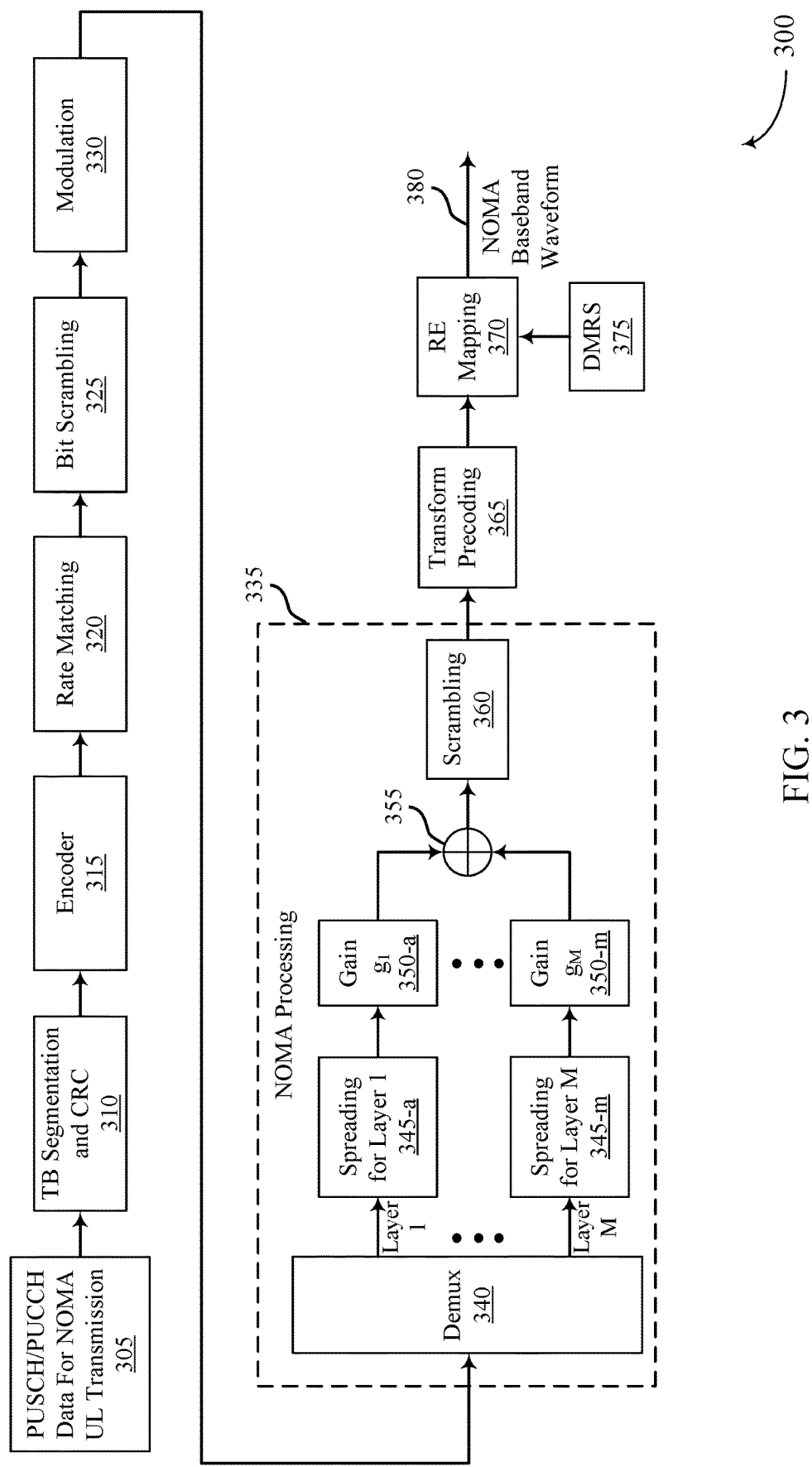
FIG. 3 illustrates an example of a NOMA transmit chain that supports multiple access signatures for NOMA wireless communications in accordance with aspects of the present disclosure.

FIG. 3 illustrates an example of a NOMA transmit chain 300 that supports multiple access signatures for NOMA wireless communications in accordance with aspects of the present disclosure. In some examples, NOMA transmit chain 300 may implement aspects of wireless communications system 100 or 200. In the example NOMA transmit chain 300 of FIG. 3, the UE may use multi-branch NOMA processing (i.e., M>1). In such cases, PUSCH/PUCCH data 305 may be provided to a transmit chain at the UE, which may perform initial transmit processing. The transmit chain may include a transport block (TB) segmentation and cyclic redundancy check (CRC) component 310, an encoder 315 (e.g., low density parity check (LDPC) encoder), rate matching component 320, bit scrambling component 325, and modulation component 330 (e.g., a BPSK, pi/2 BPSK, QPSK, OQPSK, 16QAM modulation component).

The output from the initial transmit processing, in this example, is provided to a NOMA processing portion 335 of the UE transmit chain 300. The NOMA processing portion 335 may include a demultiplexer 340, which may demultiplex the modulated data into M separate transmission streams, with each transmission stream provided to a separate NOMA branches or layers for processing. In the example of FIG. 3, each NOMA layer may include a spreading component 345, and a gain component 350. The outputs of each of the branches may be superimposed at summing component 355 to generate a combined signal that is then scrambled at scrambling component 360. In some cases, transform precoding component 365 may perform transform precoding on the output of the scrambling component 360, and a RE mapping component 370 may map the precoded symbols, as well as DMRS symbols from a DMRS component 375, to REs for uplink transmission and output a NOMA baseband waveform 380.

In some cases, different NOMA transmission branches may apply a different spreading sequence at spreading components 345. In some cases, the spreading components 345 may spread an incoming symbol across multiple symbols, such as by repeating symbols, for transmission according to a spreading sequence. In some cases, a spreading sequence may further be unique to the UE, such that a receiving device (e.g., a base station) may distinguish ML-RSMA transmissions from multiple UEs using the same resources, such as by NOMA techniques. As discussed herein, a UE-specific spreading sequence may be applied, jointly with a scrambling sequence that is applied at scrambling component 360, to jointly provide a MA signature for an uplink NOMA transmission.

In some cases, scrambling component 360 may apply a scrambling sequence to each symbol for transmission. Such a scrambling sequence may be a particular scrambling code that is applied to each symbol for transmission such that a receiving device (e.g., a base station) may distinguish ML-RSMA transmissions from the multiple NOMA transmitters. The gain components 350 may apply different gain factors $\{g_1, \ldots, g_M\}$ to each branch of the multi-branch NOMA processing.

In some cases, a UE may be configured with a mapping that may provide UE-specific spreading sequences and scrambling sequences that may depend on one or more parameters, such as a layer index, a number of layers, an identification of the UE, a UE Group identification, a spreading factor applied to the layer, a cell ID of the serving base station, slot index of a transmission, a symbol index, different TBSs, different spreading factors, different transmission powers, different MCSs, different buffer states, or combinations thereof. In some cases, the UE may determine the scrambling code and the UE-specific spreading code to be applied based on the one or more parameters, and the receiving base station may use the same parameters to differentiate different MA signatures and to decode the NOMA transmissions.

In some cases, the NOMA baseband waveform 380 may have an inverse fast Fourier transform (IFFT) performed on the frequency domain signals to generate a time domain waveform, such as a NOMA CP/DFT-s-OFDM waveform for uplink transmission. The UE may transmit the waveform via power amplifiers and antennas to a base station using the frequency and time resources identified for the uplink transmission of the uplink data. A base station receiving NOMA uplink transmission may decode each of the NOMA transmission branches in accordance with NOMA techniques, such as SIC.

In some cases, as indicated above, a scrambling code may be determined based on a UE grouping, and spreading codes may be determined based on the scrambling code grouping. In some examples, grouping may be based on modified chirp sequences (MCPs), computer generated sequences (CGSs), or pseudo random noise (PN) sequences. For example, a set of sequences may be generated for a group, using a spreading factor of K and a number of distinct spreading codes of N, where the n-th spreading code can be denoted by $$S_n \triangleq [s_n(1) s_n(2) \ldots s_n(K)]; 1 \leq n \leq N, N > K \geq 2.$$

One example of closed-form construction for each $s_n$ using a MCP would be:

$$s_n(k) \triangleq \frac{1}{\sqrt{K}} \exp\left(j\pi\left(\frac{(k+n)^2}{N}\right)\right) w(k); 1 \leq k \leq K, 1 \leq n \leq N$$

where w(k) is a perfect sequence of period K, that is $\Sigma_{k=1}^{K} w(k)w^*(k+1)=K\delta(l)$. In such examples, the spreading code generated is a Welch Bound equality (WBE) set, which achieves the Welch bound equality on sum squared correlations for arbitrary K and N satisfying $N > K \geq 2$. In other cases, CGSs or PN sequences can be used for the set of sequences of a number of groups. In some cases, where relatively low cross-correlation is desired, the N spreading codes can be partitioned into M groups, and each group has N/M orthogonal entries. In other cases, where relatively higher cross-correlation is acceptable, the N spreading codes can be partitioned into M groups, and each group has N/M non-orthogonal entries. In some cases, a base station may configure a codebook that indicates the scrambling sequence for each of the M groups of UEs and the spreading codes associated with each of the groups, and may provide an indication of the codebook to one or more UEs (e.g., via a system information block (SIB), synchronization signal block (SSB), master information block (MIB), remaining minimum system information (RMSI), radio resource control (RRC) signaling, dynamic downlink control information (DCI), other broadcast transmission, or combinations thereof). In some cases, one or more codebooks may be preconfigured at the UEs and base station.

In cases that use orthogonal spreading codes for UE grouping, the MCP, CGS or PN sequences can be used to construct orthogonal spreading codes in UE grouping, a codebook (e.g., derived using MCP) is denoted by (N, K), where K is the spreading factor, and N is the size of codebook. In some cases, a large N can be selected to configure the MA signatures of N UEs. For example, if $N \geq KM$, then at least K groups of orthogonal spreading codes can be systematically constructed by MCP, in which:

$$\text{Group}_x = \{S_x, S_{x+K'}, \ldots, S_{x+(M-1)*K'}\}, \text{ where } x=1, 2, \ldots, K \text{ and } K' \geq K.$$

In some cases, the M spreading codes within $\text{Group}_x$ are orthogonal or quasi-orthogonal, and can be assigned to the M UEs within UE $\text{Group}_x$. In some cases, group-specific scrambling and power multiplexing can be applied in conjunction with the M orthogonal or quasi-orthogonal spreading codes to the M UEs within the same group. Such UE grouping may be applied to DMRS/preamble and PUSCH data transmissions, and similar or different orthogonal or quasi-orthogonal spreading codes can be applied to both DMRS/preamble and PUSCH transmissions to systematically extend the pool size of MA signatures.

In cases that may use non-orthogonal spreading codes within UE groupings, such MCP, CGS or PN sequences may also be used to construct a set of non-orthogonal spreading codes. Such non-orthogonal spreading codes may allow more UE groups or more UEs within a group, and in some cases may be used when a relatively large number of UEs are configured for NOMA transmissions. For example, for a MCP generated set of spreading codes where $N \geq KM$, then at least K groups of non-orthogonal spreading codes can be formed, in which:

$$-\text{Group}_x = \{S_x, S_{x+K'}, \ldots, S_{x+(M-1)*K'}\}, \text{ where } x=1, 2, \ldots, K \text{ and } K' \geq K.$$

In some cases, the M spreading codes within $\text{Group}_x$ are non-orthogonal, which can be assigned to the M UEs within UE $\text{Group}_x$. In some cases, group-specific scrambling or power multiplexing may be applied in conjunction with M spreading codes to the M UEs within a same group. Similarly as indicated above, UE groupings may be applied to both DMRS/preamble and PUSCH transmissions, and similar or different non-orthogonal spreading codes can be applied to both DMRS/preamble and PUSCH transmissions to systematically extend the pool size of MA signatures.

In some further examples, hybrid UE groupings may be configured, in which a hybrid use of orthogonal and non-orthogonal spreading codes may be included in a hybrid UE grouping. In such cases, a number of UEs in each group may be different, a spreading factor in each group may be different, or combinations thereof. Further, in some cases, a hybrid use of different types of spreading sequences (e.g., MCP, CGS or PN sequences) may be used, which may be applied to both DMRS/preamble and PUSCH transmissions.

Figure 4:
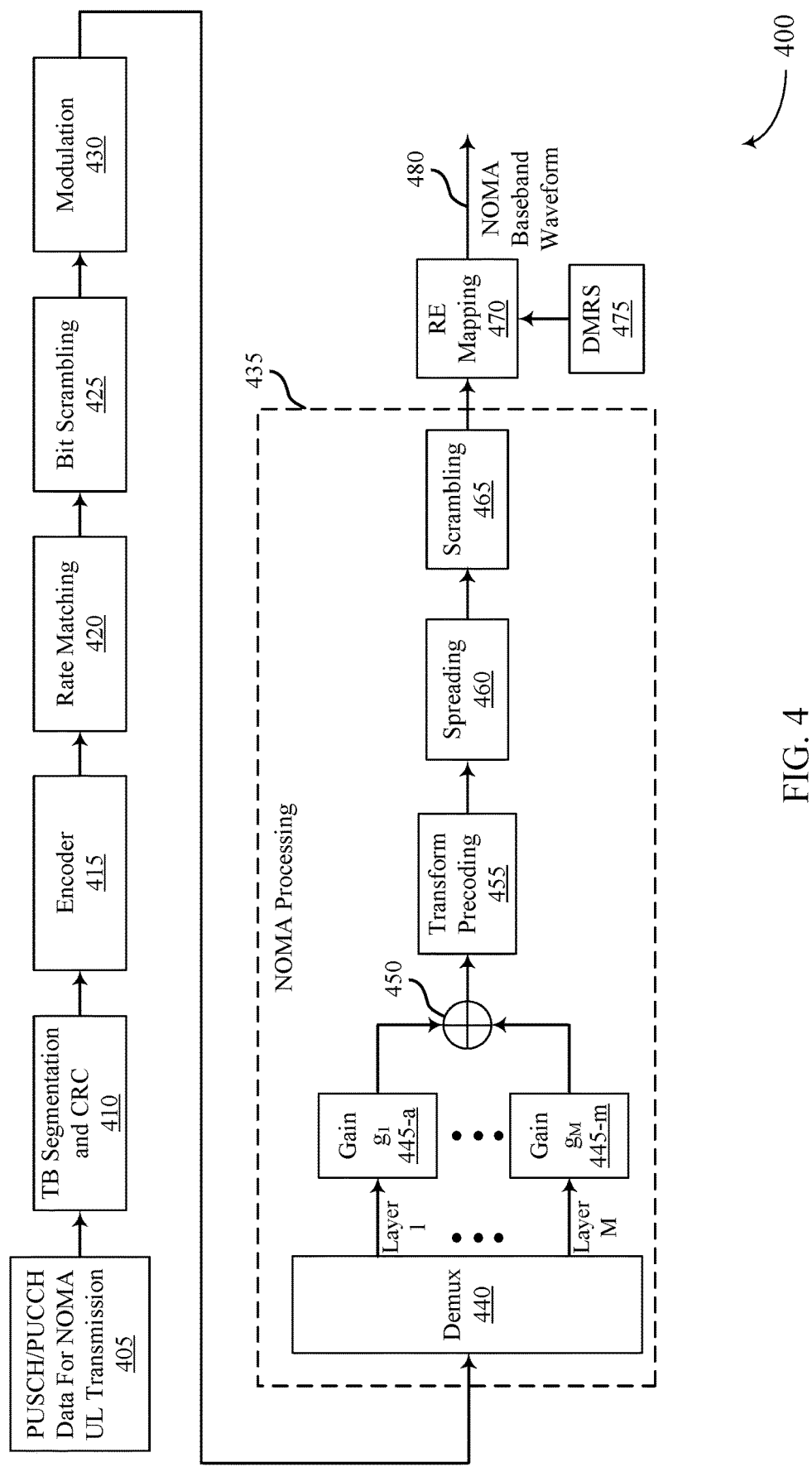
FIG. 4 illustrates an example of a NOMA transmit chain that supports multiple access signatures for NOMA wireless communications in accordance with aspects of the present disclosure.

FIG. 4 illustrates another example of a NOMA transmit chain 400 that supports multiple access signatures for NOMA wireless communications in accordance with aspects of the present disclosure. In some examples, NOMA transmit chain 400 may implement aspects of wireless communications system 100 or 200. In the example NOMA transmit chain 400 of FIG. 4, the UE may use multi-branch NOMA processing (i.e., M>1), in which scrambling and spreading are performed on a superimposed signal containing symbols of multiple NOMA layers. In such cases, PUSCH/PUCCH data 405 again may be provided to a transmit chain at the UE, which may perform initial transmit processing. The transmit chain may include a transport block (TB) segmentation and cyclic redundancy check (CRC) component 410, an encoder 415 (e.g., low density parity check (LDPC) encoder), rate matching component 420, bit scrambling component 425, and modulation component 430 (e.g., a BPSK, pi/2 BPSK, QPSK, OQPSK, 16QAM modulation component).

The output from the initial transmit processing, in this example, is provided to a NOMA processing portion 435 of the UE transmit chain 400. The NOMA processing portion 435 may include a demultiplexer 440, which may demultiplex the modulated data into M separate transmission streams, with each transmission stream provided to a separate NOMA branches or layers for processing. In the example of FIG. 4, each NOMA layer may include a gain component 445. The outputs of each of the branches may be superimposed at summing component 450 to generate a combined signal that may be precoded at transform precoding component 455, spread at spreading component 460, and scrambled at scrambling component 465. In some cases, a RE mapping component 470 may map the spread and scrambled symbols, as well as DMRS symbols from a DMRS component 475, to REs for uplink transmission and output a NOMA baseband waveform 480.

Similarly as discussed with respect to FIG. 3, the spreading component 460 may spread an incoming symbol across multiple symbols, such as by repeating symbols, for transmission according to a spreading sequence. In some cases, a spreading sequence may further be unique to the UE, such that a receiving device (e.g., a base station) may distinguish ML-RSMA transmissions from multiple UEs using the same resources, such as by NOMA techniques. As discussed herein, a UE-specific spreading sequence may be applied, jointly with a scrambling sequence that is applied at scrambling component 465, to jointly provide a MA signature for an uplink NOMA transmission.

Figure 5:
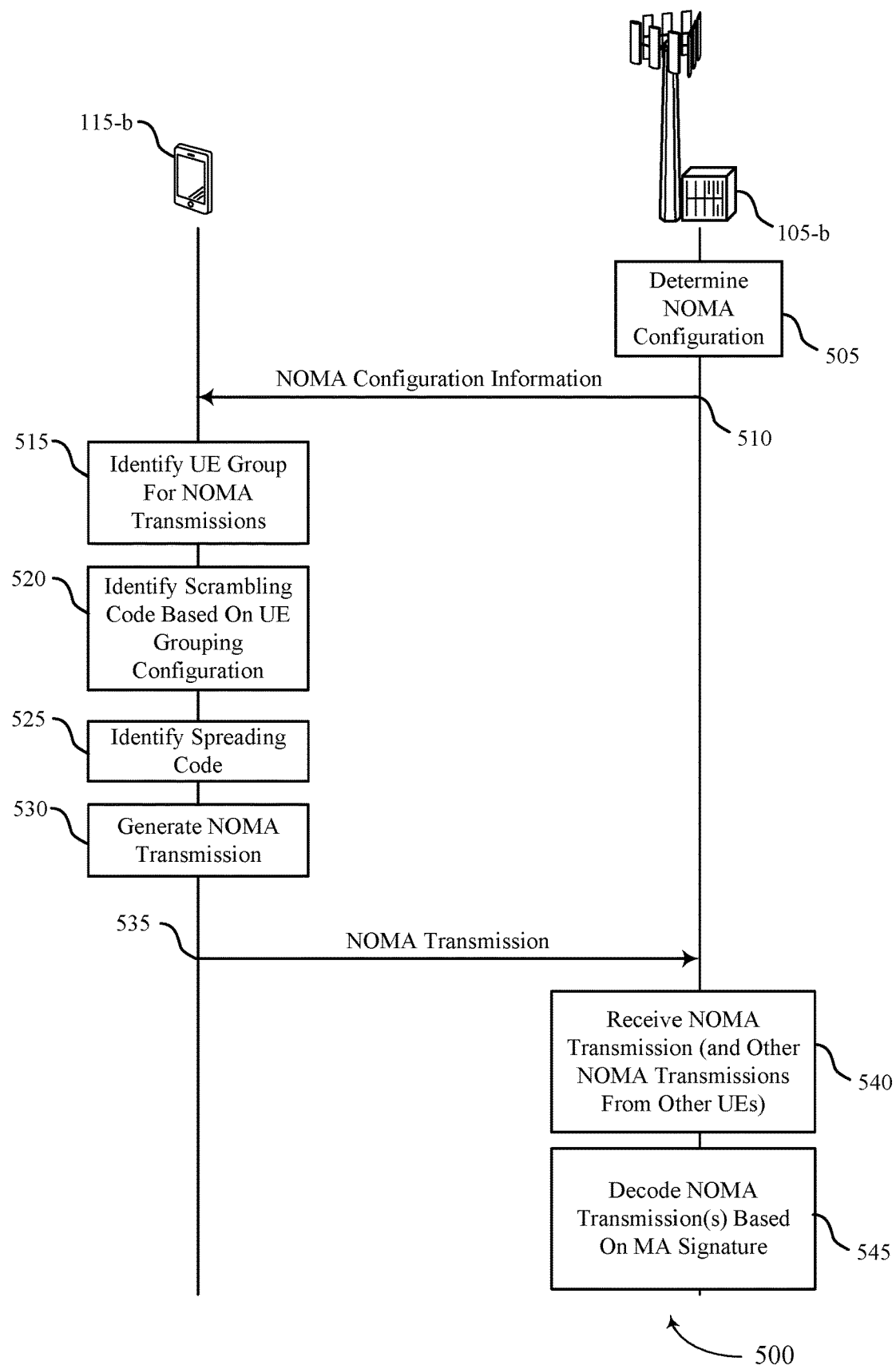
FIG. 5 illustrates an example of a process flow that supports multiple access signatures for NOMA wireless communications in accordance with aspects of the present disclosure.

FIG. 5 illustrates an example of a process flow 500 that supports multiple access signatures for NOMA wireless communications in accordance with aspects of the present disclosure. In some examples, process flow 500 may implement aspects of wireless communications system 100 or 200. Process flow 500 includes UE 115-b and base station 105-b, which may be respective examples of a UE 115 and a base station 105 as described herein.

The base station 105-b in this example, at 505, may determine a NOMA configuration for uplink NOMA transmissions from a number of UEs. The NOMA configuration may include, for example, a NOMA slot configuration, which may include one or more of a number of downlink symbols, a number of uplink NOMA preamble symbols, a number of uplink DMRS symbols, a number of PUSCH/PUCCH symbols, a maximum number of NOMA transmission branches that may be used by the UE 115-b, available NOMA preambles based on the number of NOMA transmission branches, a BWP for NOMA preamble transmission based on the number of NOMA transmission branches, or any combinations thereof. The NOMA configuration NOMA may be based on various parameters, such as a number of UEs that may potentially transmit NOMA uplink transmissions, SE, reliability, or latency requirements of the UEs, resources available for NOMA transmissions, capabilities of UEs that are served by the base station 105-b, and the like.

In some cases, the NOMA configuration information may include MA signature configuration information. For example, the NOMA configuration may include an indication of a number of codebooks that may be used to determine a MA signature for uplink NOMA transmissions. For example, the codebooks may provide a number of sets of UE-specific spreading codes that may be associated with a scrambling code that is to be applied to an uplink NOMA transmission. In some cases, a number of different sets of spreading codes may be provided for UE groupings associated with different scrambling codes. In some cases, the UE groupings may be based on one or more parameters of the UE 115-b, such as, for example, a TBS, MCS, transmission power, UE buffer size, or combinations thereof. The base station 105-b may transmit NOMA configuration information 510 to the UE 115-b. In some cases, the NOMA configuration information 510 may be provided to the UE 115-b via semi-static signaling (e.g., RRC signaling), via other signaling (e.g., via group PDCCH, SIB, MIB, RMSI, or SSB), via dynamic DCI, or combinations thereof.

At 515, the UE 115-b may identify a UE group associated with one or more NOMA transmissions. As discussed herein, the UE group may be determined based on one or more parameters of the UE 115-b, such as, for example, a TBS, MCS, transmission power, UE buffer size, distance of the UE 115-b from the base station 105-b, or combinations thereof. In some cases, each UE group may be associated with a different scrambling code that may be used to generate a MA sequence for an uplink NOMA transmission.

At 520, the UE 115-b may identify a scrambling code based on the UE group. In some cases, the UE group, as discussed above, may be determined based on one or more parameters of the UE 115-b, such as, for example, a TBS, MCS, transmission power control scheme, UE buffer size, power headroom, distance of the UE 115-b from the base station 105-b, or combinations thereof. The UE group may be determined, in some cases, based on the NOMA configuration information. In some cases, the NOMA configuration may include a number of codebooks in which a particular scrambling code may be associated with a set of orthogonal or non-orthogonal spreading codes, and the UE 115-b may identify one of the scrambling codes for an uplink NOMA transmission.

At 525, the UE 115-b may identify a spreading code. As discussed above, the spreading code may be a UE-specific spreading code that may be applied to each layer of a multi-layer transmission or that may be applied following symbols of multiple layers being superimposed. In some cases, the spreading code may be determined from a set of available spreading codes that are associated with the identified scrambling code. The set of spreading codes may be a set on orthogonal or non-orthogonal spreading codes.

At 530, the UE 115-b may generate a NOMA transmission. The NOMA transmission may be generated, in some examples, based on a MA signature that is applied at the symbol-level to a NOMA signal jointly by applying the spreading code and scrambling code. In some cases, the NOMA transmission may be generated by mapping the spread and scrambled NOMA signal (e.g., PUCCH/PUSCH data), and a reference signal (e.g., DMRS) to uplink transmission resources. The UE 115-b may then transmit the NOMA transmission 535 to the base station 105-b.

At 540, the base station 105-b may receive the NOMA transmission from the UE 115-b, as well as concurrent NOMA transmissions from one or more other UEs that are transmitted using common time, frequency, and spatial resources. The base station 105-b, in some cases, may identify one or more different NOMA transmissions based at least in part on the MA sequence that is applied to each NOMA transmission.

At 545, the base station 105-b may decode the uplink NOMA transmissions based at least in part on the MA signature associated with the UE 115-b. In some cases, the base station 105-b may perform NOMA demodulation and decoding based on SIC/MUD using NOMA decoding techniques.

Figure 6:
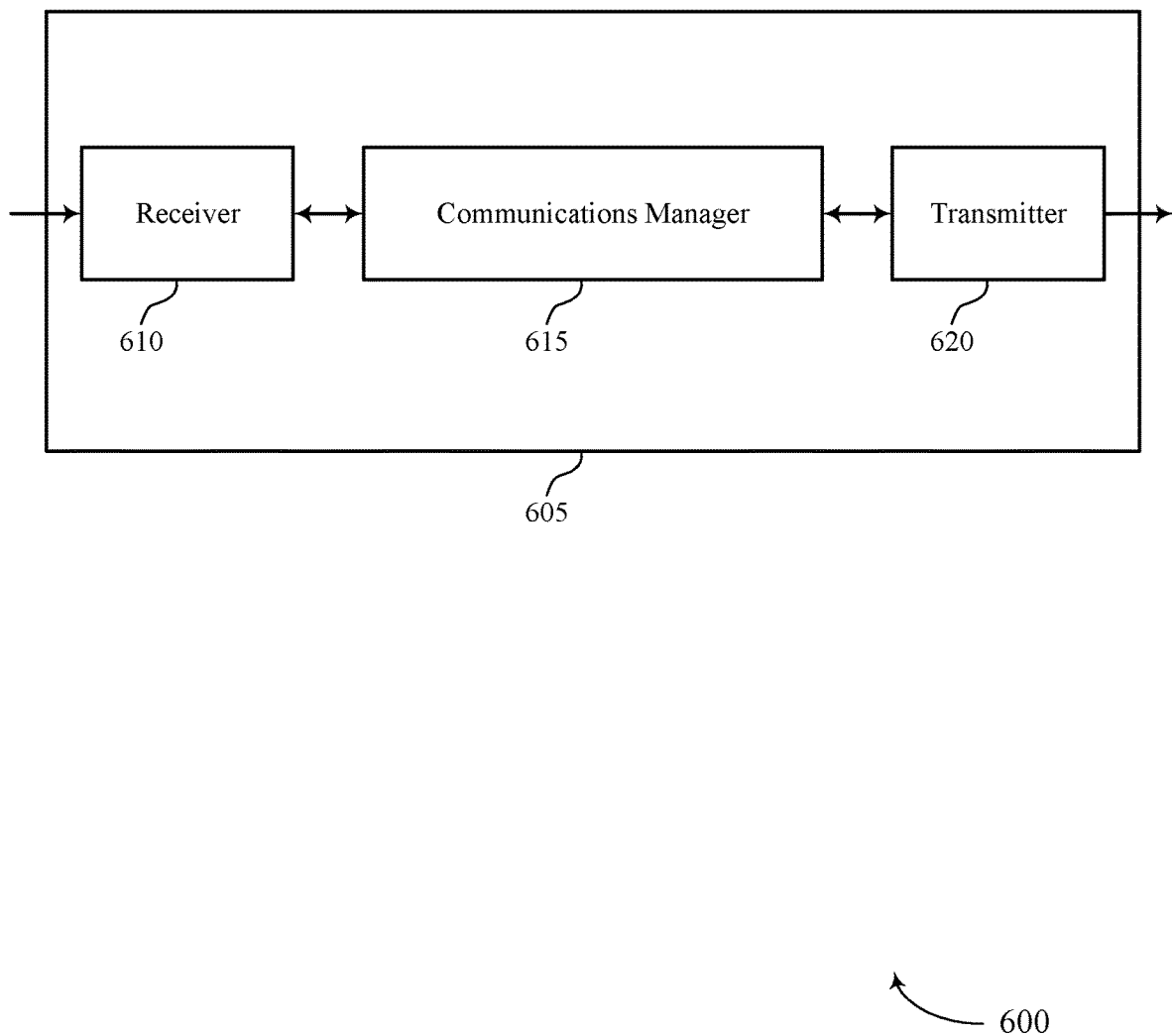
FIGS. 6 and 7 show block diagrams of devices that support multiple access signatures for NOMA wireless communications in accordance with aspects of the present disclosure.

FIG. 6 shows a block diagram 600 of a device 605 that supports multiple access signatures for NOMA wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multiple access signatures for NOMA wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a MA signature to be applied to an uplink NOMA communication to a base station, where the MA signature is based on a UE-specific spreading code and a scrambling code associated with a first group of UEs, apply the MA signature to the uplink NOMA communication, and transmit the uplink NOMA communication to the base station. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
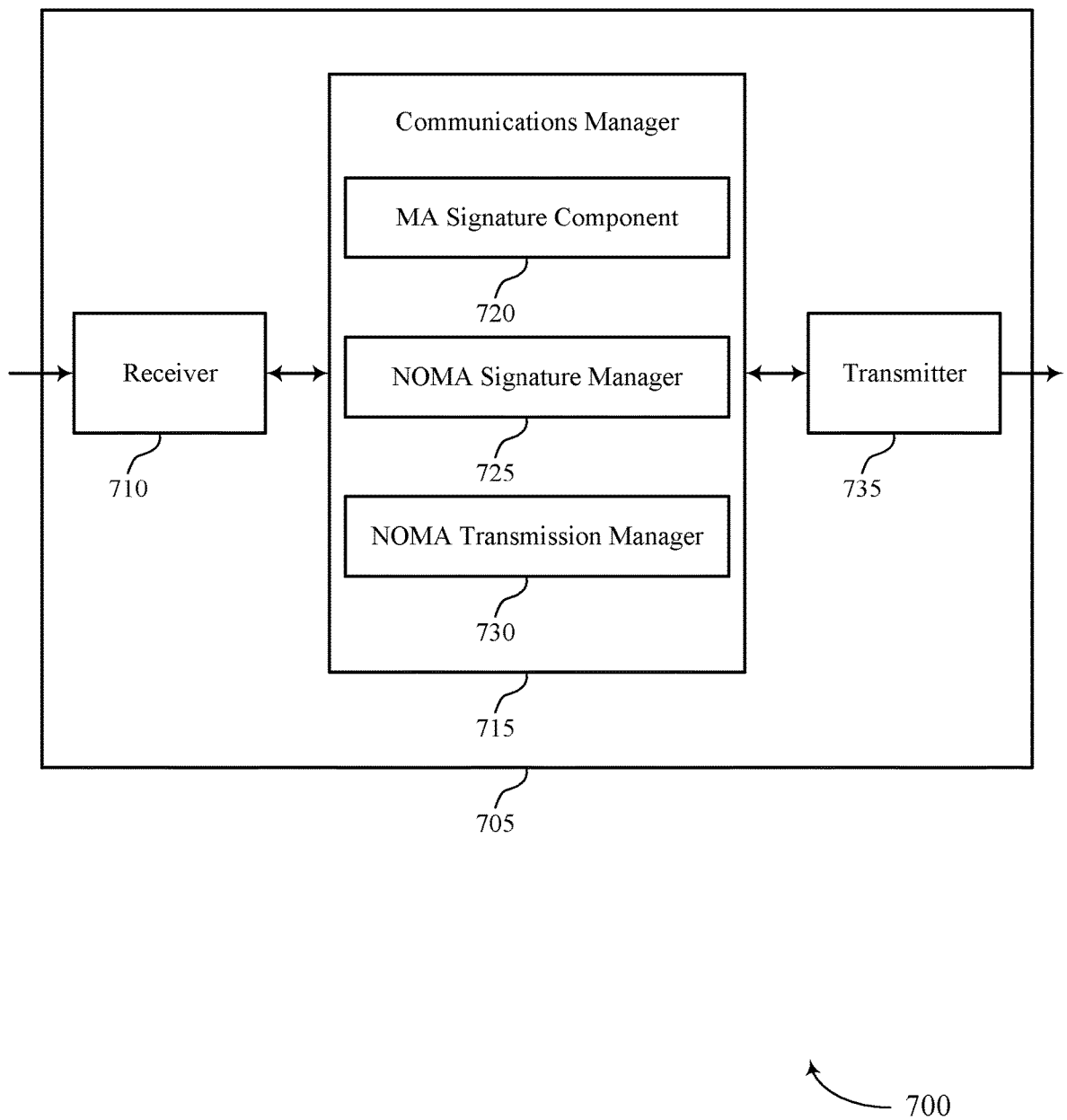

FIG. 7 shows a block diagram 700 of a device 705 that supports multiple access signatures for NOMA wireless communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to multiple access signatures for NOMA wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a MA signature component 720, a NOMA signature manager 725, and a NOMA transmission manager 730. The communications manager 715 may be an example of aspects of the communications manager 910 described herein.

The MA signature component 720 may determine a MA signature to be applied to an uplink NOMA communication to a base station, where the MA signature is based on a UE-specific spreading code and a scrambling code associated with a first group of UEs. The NOMA signature manager 725 may apply the multiple access signature to the uplink NOMA communication. The NOMA transmission manager 730 may transmit the uplink NOMA communication to the base station.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
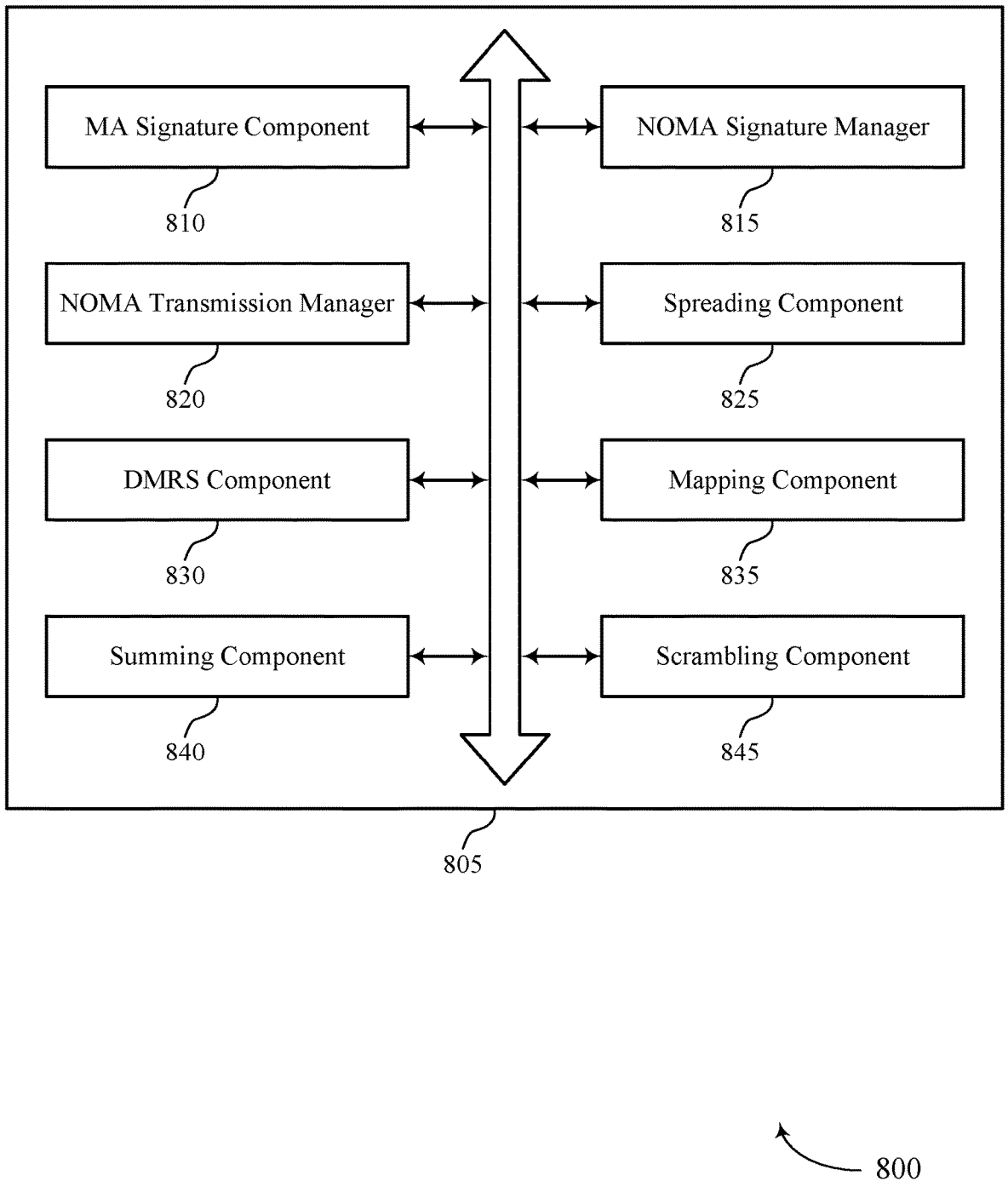
FIG. 8 shows a block diagram of a communications manager that supports multiple access signatures for NOMA wireless communications in accordance with aspects of the present disclosure.

FIG. 8 shows a block diagram 800 of a communications manager 805 that supports multiple access signatures for NOMA wireless communications in accordance with aspects of the present disclosure. The communications manager 805 may be an example of aspects of a communications manager 615, a communications manager 715, or a communications manager 910 described herein. The communications manager 805 may include a MA signature component 810, a NOMA signature manager 815, a NOMA transmission manager 820, a spreading component 825, a DMRS component 830, a mapping component 835, a summing component 840, and a scrambling component 845. Each of these modules may communicate, directly or indirectly, with one another (e.g., via one or more buses).

The MA signature component 810 may determine a MA signature to be applied to an uplink NOMA communication to a base station, where the MA signature is based on a UE-specific spreading code and a scrambling code associated with a first group of UEs. In some examples, the MA signature component 810 may receive MA signature configuration information from the base station that indicates the UE-specific spreading code and the scrambling code associated with the first group of UEs. In some examples, the MA signature component 810 may apply the MA signature to PUSCH data to be included with the uplink NOMA communication.

In some examples, the MA signature component 810 may identify a set of codebooks that each include a set of UE-specific spreading codes, each of the set of codebooks associated with a different group of UEs of a set of groups of UEs. In some examples, the MA signature component 810 may select the first group of UEs from the set of groups of UEs based on one or more of an amount of data to be transmitted in the uplink NOMA communication, a transmission power for the uplink NOMA communication, a spreading factor to be used for the UE-specific spreading codes, or a modulation and coding scheme (MCS) to be used for the uplink NOMA communication. In some examples, the MA signature component 810 may select the UE-specific spreading code from the first codebook based on a UE identification or an index value assigned to the UE by the base station. In some cases, the MA signature configuration information is received from the base station in a master information block (MIB), in a SIB, in remaining minimum system information (RMSI), in a group common PDCCH, in RRC signaling, in dynamic DCI associated with the uplink NOMA communication, or any combination thereof. In some cases, the MA signature applied to PUSCH data includes a short spreading code and a group-specific scrambling code, and where the short spreading code is jointly configured for both the PUSCH data and the base DMRS sequence.

The NOMA signature manager 815 may apply the MA signature to the uplink NOMA communication. The NOMA transmission manager 820 may transmit the uplink NOMA communication to the base station.

The spreading component 825 may apply the UE-specific spreading code or permutation pattern to each layer of a multi-layer NOMA uplink communication. In some examples, the spreading component 825 may apply the UE-specific spreading code to a superimposed NOMA uplink signal to generate a spread superimposed NOMA uplink signal. In some cases, the UE-specific spreading code is one of a set of orthogonal UE-specific spreading codes, in which a cross-correlation between different UE-specific spreading codes of the set of orthogonal UE-specific spreading codes is below a threshold value. In some cases, the UE-specific spreading code is one of a set of UE-specific spreading codes in which at least a subset of the UE-specific spreading codes are non-orthogonal to other UE-specific spreading codes of the set of UE-specific spreading codes. In some cases, the UE-specific spreading code is determined from a set of available spreading codes, the set of available spreading codes corresponding to a spreading factor and a number of distinct spreading codes.

In some cases, the UE-specific spreading code is determined using a closed form expression in which each of a set of available spreading codes can be determined based on a spreading factor and a number of distinct spreading codes. In some cases, the set of UE-specific spreading codes of each of the set of codebooks include modified chirp sequences (MCPs), computer generated sequences (CGSs), pseudo-random noise (PN) sequences, or combinations thereof. In some cases, the set of UE-specific spreading codes of each of the set of codebooks include orthogonal spreading codes, non-orthogonal spreading codes, or a hybrid of orthogonal spreading codes and non-orthogonal spreading codes.

The DMRS component 830 may apply a demodulation reference signal (DMRS) signature to a DMRS to be included with the uplink NOMA communication. In some cases, the DMRS signature includes an orthogonal cover code (OCC) or quasi-orthogonal cover code and a group scrambling or short spreading code that are applied to a base DMRS sequence.

The mapping component 835 may provide a mapping between spreading codes, scrambling codes, and UE groups. In some cases, a mapping between the MA signature and the DMRS signature is provided in MA signature configuration information provided by the base station. In some cases, a set of codebooks include two or more codebooks that are each associated with different numbers of UEs, different spreading factors for associated UE-specific spreading codes, different types of UE-specific spreading codes, or combinations thereof.

The summing component 840 may superimpose each layer of the multi-layer NOMA uplink communication to generate a superimposed NOMA uplink signal. In some examples, the summing component 840 may superimpose each of a set of layers of a multi-layer NOMA uplink communication to generate a superimposed NOMA uplink signal.

The scrambling component 845 may apply the scrambling code to the superimposed NOMA uplink signal. In some examples, the scrambling component 845 may apply the scrambling code to the spread superimposed NOMA uplink signal.

Figure 9:
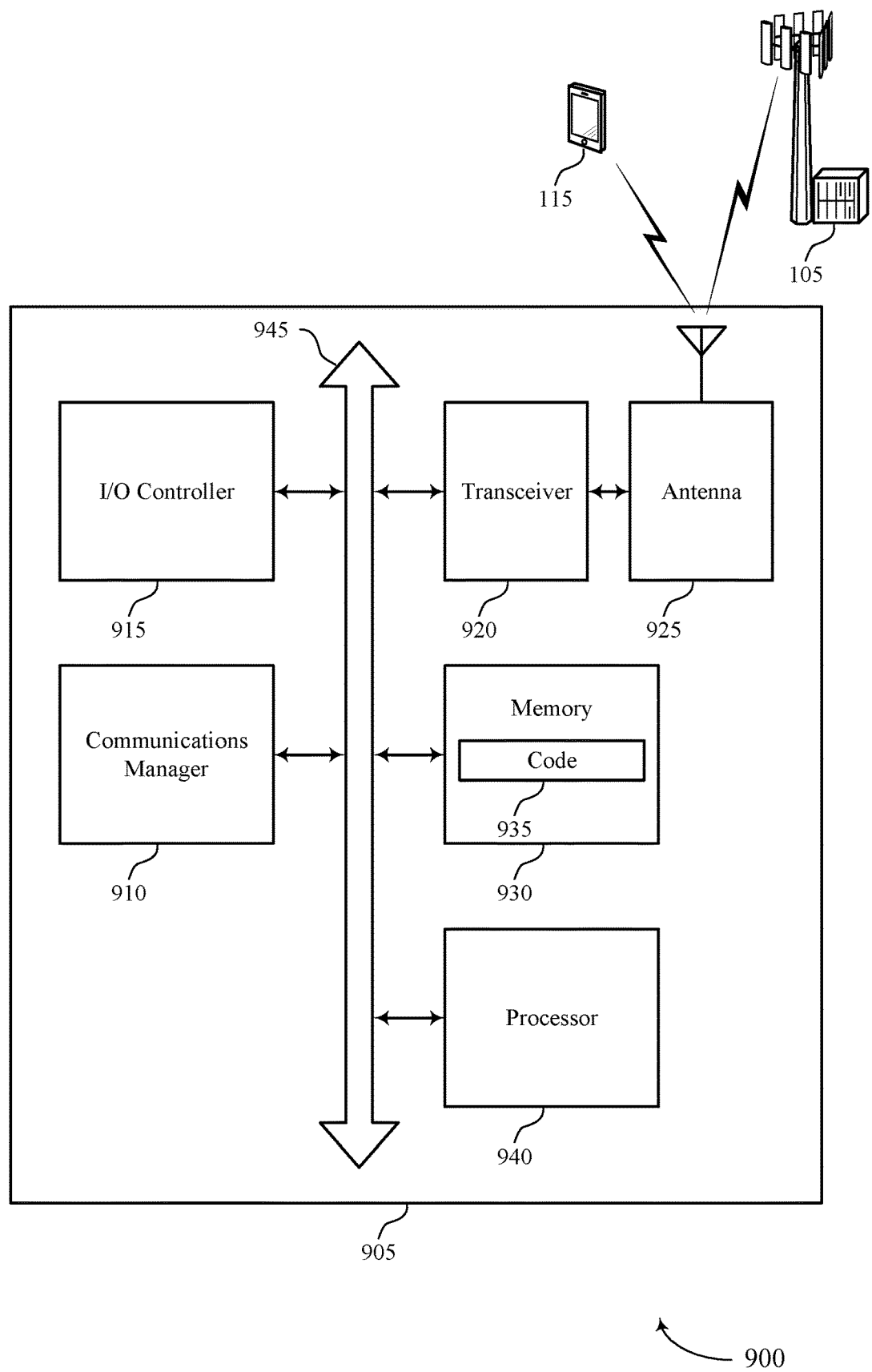
FIG. 9 shows a diagram of a system including a device that supports multiple access signatures for NOMA wireless communications in accordance with aspects of the present disclosure.

FIG. 9 shows a diagram of a system 900 including a device 905 that supports MA signatures for NOMA wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine a MA signature to be applied to an uplink NOMA communication to a base station, where the MA signature is based on a UE-specific spreading code and a scrambling code associated with a first group of UEs, apply the MA signature to the uplink NOMA communication, and transmit the uplink NOMA communication to the base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as discussed herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting MA signatures for NOMA wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
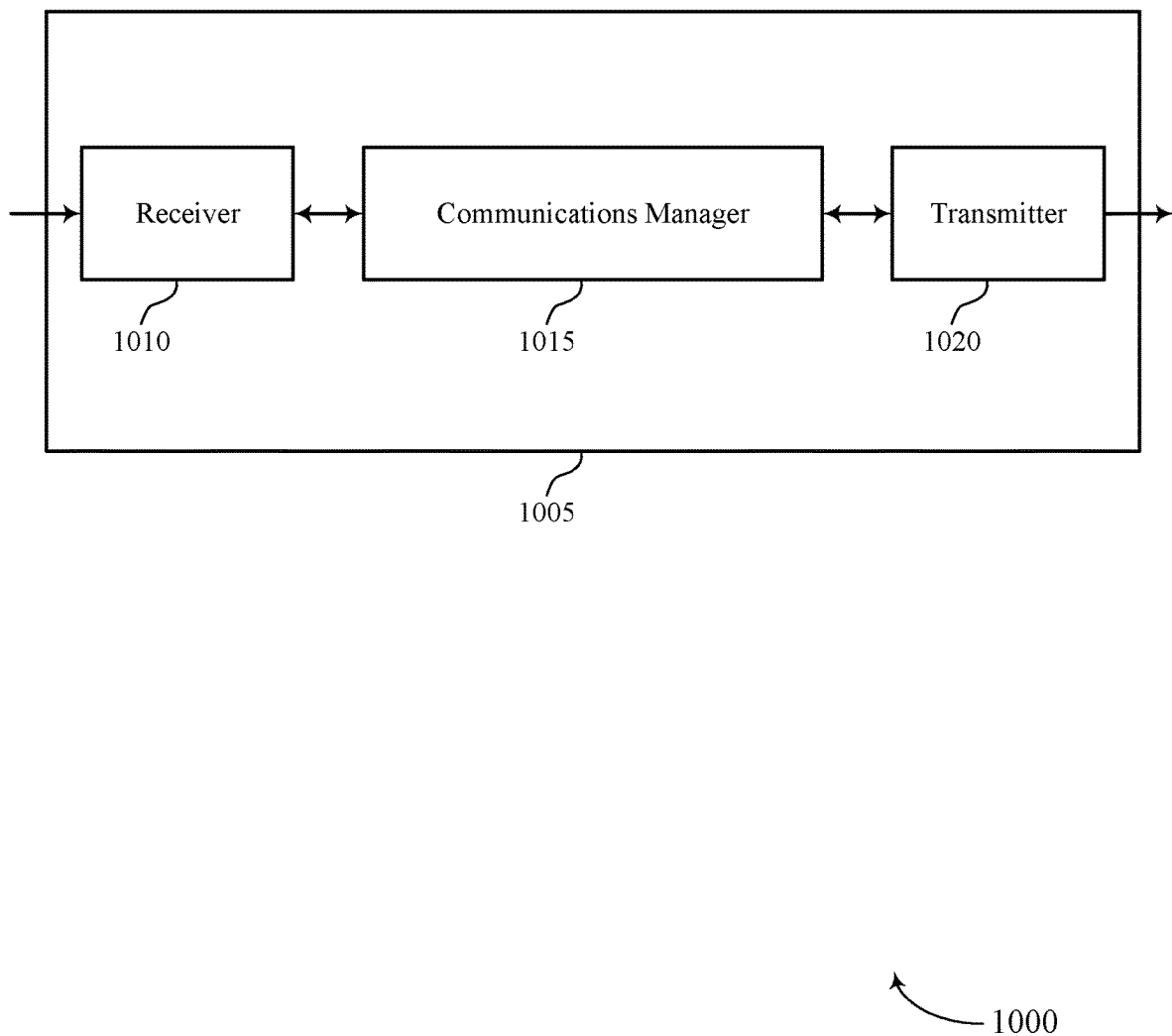
FIGS. 10 and 11 show block diagrams of devices that support multiple access signatures for NOMA wireless communications in accordance with aspects of the present disclosure.

FIG. 10 shows a block diagram 1000 of a device 1005 that supports MA signatures for NOMA wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to MA signatures for NOMA wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of UEs configured for concurrent uplink NOMA communications, transmit, to the set of UEs, an indication of a MA signature to be applied to uplink NOMA communications of each UE of the set of UEs, where the MA signature for each UE is based on a UE-specific spreading code and a scrambling code associated with a group of UEs, receive at least two concurrent uplink NOMA communications from at least two UEs of the set of UEs using a common set of uplink resources, and determine each UE of the set of UEs that transmitted each of the at least two concurrent uplink NOMA communications, based on MA signatures that are applied to each of the concurrent uplink NOMA communications. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
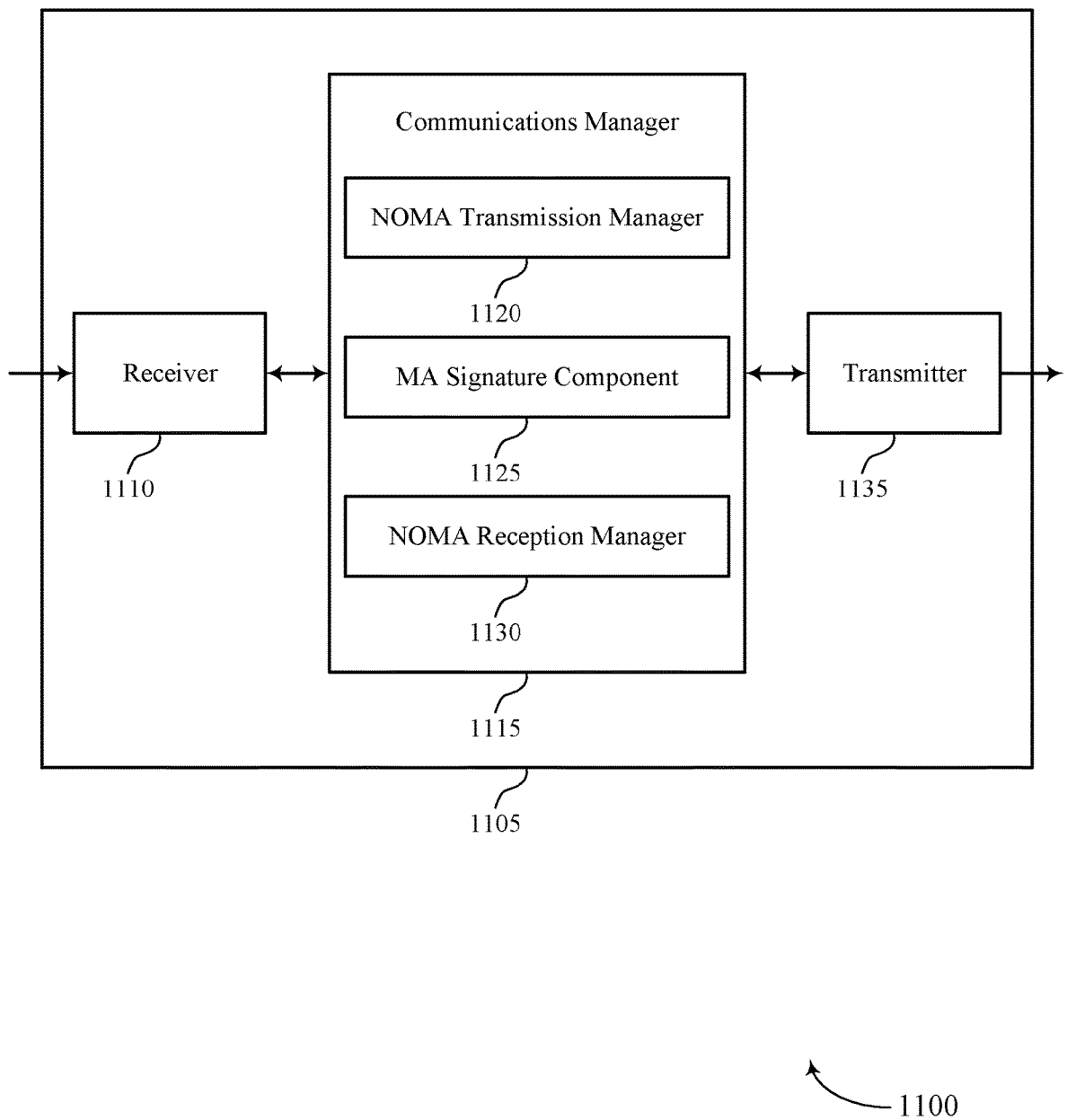

FIG. 11 shows a block diagram 1100 of a device 1105 that supports MA signatures for NOMA wireless communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to MA signatures for NOMA wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a NOMA transmission manager 1120, a MA signature component 1125, and a NOMA reception manager 1130. The communications manager 1115 may be an example of aspects of the communications manager 1310 described herein.

The NOMA transmission manager 1120 may identify a set of UEs configured for concurrent uplink NOMA communications. The MA signature component 1125 may transmit, to the set of UEs, an indication of a MA signature to be applied to uplink NOMA communications of each UE of the set of UEs, where the MA signature for each UE is based on a UE-specific spreading code and a scrambling code associated with a group of UEs and determine each UE of the set of UEs that transmitted each of the at least two concurrent uplink NOMA communications, based on MA signatures that are applied to each of the concurrent uplink NOMA communications. The NOMA reception manager 1130 may receive at least two concurrent uplink NOMA communications from at least two UEs of the set of UEs using a common set of uplink resources.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
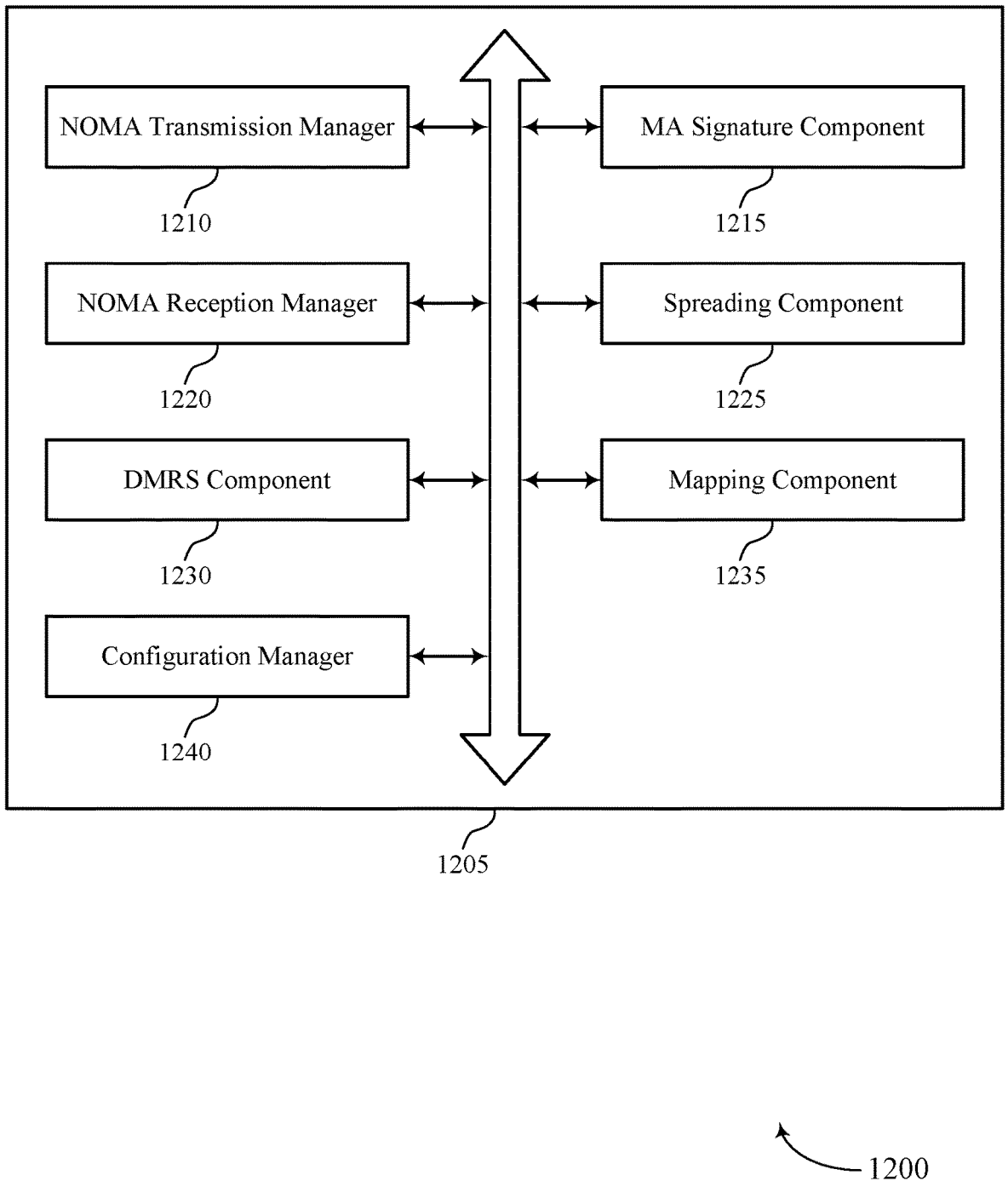
FIG. 12 shows a block diagram of a communications manager that supports multiple access signatures for NOMA wireless communications in accordance with aspects of the present disclosure.

FIG. 12 shows a block diagram 1200 of a communications manager 1205 that supports MA signatures for NOMA wireless communications in accordance with aspects of the present disclosure. The communications manager 1205 may be an example of aspects of a communications manager 1015, a communications manager 1115, or a communications manager 1310 described herein. The communications manager 1205 may include a NOMA transmission manager 1210, a MA signature component 1215, a NOMA reception manager 1220, a spreading component 1225, a DMRS component 1230, a mapping component 1235, and a configuration manager 1240. Each of these modules may communicate, directly or indirectly, with one another (e.g., via one or more buses).

The NOMA transmission manager 1210 may identify a set of UEs configured for concurrent uplink NOMA communications. In some cases, the set of UEs may be identified based on a UE class, a UE category, or an indication of the UE that NOMA data is to be transmitted, for example.

The MA signature component 1215 may transmit, to the set of UEs, an indication of a MA signature to be applied to uplink NOMA communications of each UE of the set of UEs, where the MA signature for each UE is based on a UE-specific spreading code and a scrambling code associated with a group of UEs. In some examples, the MA signature component 1215 may determine each UE of the set of UEs that transmitted each of the at least two concurrent uplink NOMA communications, based on MA signatures that are applied to each of the concurrent uplink NOMA communications. In some cases, the indication of the MA signature to be applied to uplink NOMA communications of each UE of the set of UEs is transmitted in a master information block (MIB), in a SIB, in remaining minimum system information (RMSI), in a group common PDCCH, in RRC signaling to each of the set of UEs, in dynamic DCI signaling to each of the set of UEs, or any combination thereof. In some cases, the MA signatures that are applied to each of the concurrent uplink NOMA communications are applied to PUSCH data included with the uplink NOMA communication, and where a demodulation reference signal (DMRS) signature is applied to a DMRS that is transmitted with the uplink NOMA communication.

The NOMA reception manager 1220 may receive at least two concurrent uplink NOMA communications from at least two UEs of the set of UEs using a common set of uplink resources.

The spreading component 1225 may identify spreading codes for NOMA transmissions, and may provide an indication of spreading codes (e.g., via a codebook indication). In some cases, the UE-specific spreading code of each UE of the set of UEs is one of a set of orthogonal UE-specific spreading codes associated with each of a set of groups of UEs. In some cases, a cross-correlation between different UE-specific spreading codes of the set of orthogonal UE-specific spreading codes is below a threshold value. In some cases, the UE-specific spreading code of each UE of the set of UEs is one of a set of UE-specific spreading codes in which at least a subset of the UE-specific spreading codes are non-orthogonal to other UE-specific spreading codes of the set of UE-specific spreading codes. In some cases, the UE-specific spreading codes of each of the set of UEs is determined from a set of available spreading codes based on a spreading factor and a number of distinct spreading codes. In some cases, the UE-specific spreading codes of each of the set of UEs is determined using a closed form expression in which each of a set of available spreading codes can be determined based on a spreading factor and a number of distinct spreading codes.

The DMRS component 1230 may receive a DMRS associated with a NOMA transmission. In some cases, a DMRS signature includes an orthogonal cover code (OCC) or quasi-orthogonal cover code and a group scrambling or short spreading code that are applied to a base DMRS sequence.

The mapping component 1235 may provide scrambling code, spreading code, and UE group mapping information. In some cases, a mapping between the MA signature and the DMRS signature is provided in MA signature configuration information.

The configuration manager 1240 may transmit information associated with a set of codebooks to each of the set of UEs, where each of the set of codebooks include a set of UE-specific spreading codes, and each of the set of codebooks are associated with one or more of an amount of data to be transmitted by a UE in an associated uplink NOMA communication, a transmission power of the UE, a spreading factor to be used for the UE-specific spreading codes, or a modulation and coding scheme (MCS) to be used by the UE. In some cases, the UE-specific spreading code of each of the set of codebooks is based on a UE identification or an index value assigned to the UE. In some cases, the set of UE-specific spreading codes of each of the set of codebooks include modified chirp sequences (MCPs), computer generated sequences (CGSs), pseudo-random noise (PN) sequences, or combinations thereof. In some cases, the set of UE-specific spreading codes of each of the set of codebooks include orthogonal spreading codes, non-orthogonal spreading codes, or a hybrid of orthogonal spreading codes and non-orthogonal spreading codes. In some cases, the set of codebooks include two or more codebooks that are each associated with different numbers of UEs, different spreading factors for associated UE-specific spreading codes, different types of UE-specific spreading codes, or combinations thereof.

Figure 13:
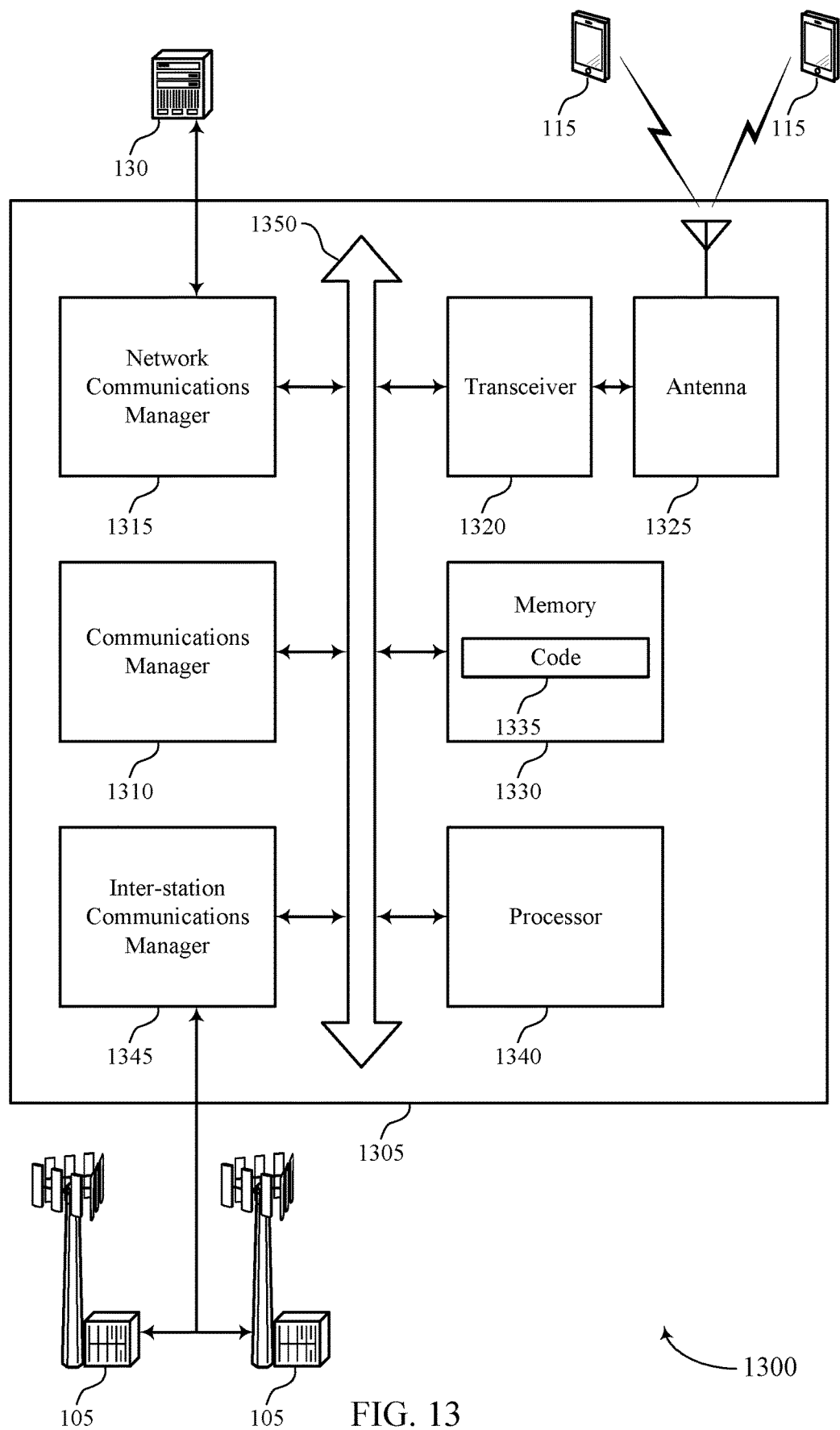
FIG. 13 shows a diagram of a system including a device that supports multiple access signatures for NOMA wireless communications in accordance with aspects of the present disclosure.

FIG. 13 shows a diagram of a system 1300 including a device 1305 that supports MA signatures for NOMA wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of UEs configured for concurrent uplink NOMA communications, transmit, to the set of UEs, an indication of a MA signature to be applied to uplink NOMA communications of each UE of the set of UEs, where the MA signature for each UE is based on a UE-specific spreading code and a scrambling code associated with a group of UEs, receive at least two concurrent uplink NOMA communications from at least two UEs of the set of UEs using a common set of uplink resources, and determine each UE of the set of UEs that transmitted each of the at least two concurrent uplink NOMA communications, based on MA signatures that are applied to each of the concurrent uplink NOMA communications.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as discussed herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device to perform various functions (e.g., functions or tasks supporting MA signatures for NOMA wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
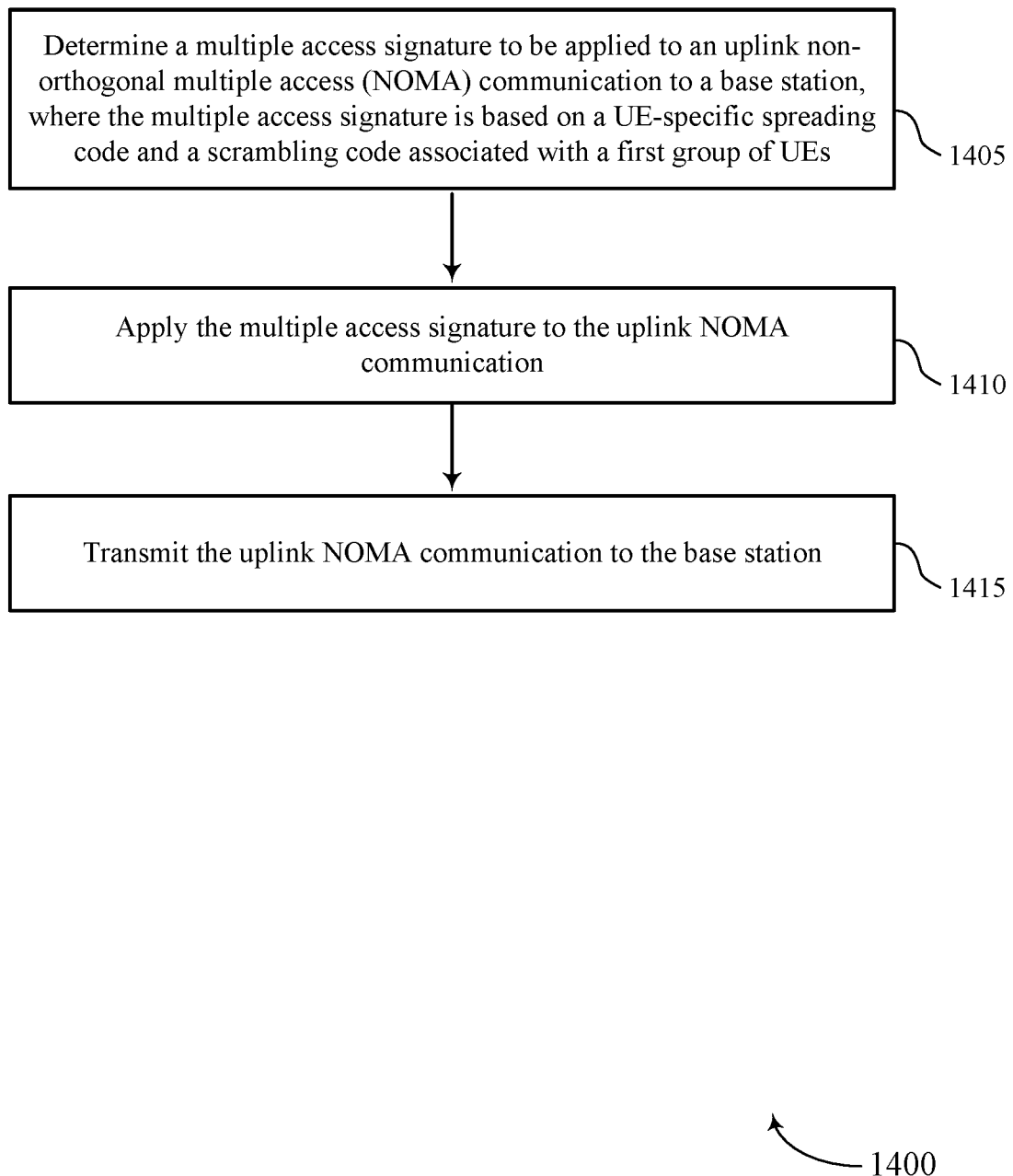
FIGS. 14 through 20 show flowcharts illustrating methods that support multiple access signatures for NOMA wireless communications in accordance with aspects of the present disclosure.

FIG. 14 shows a flowchart illustrating a method 1400 that supports MA signatures for NOMA wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions discussed herein. Additionally or alternatively, a UE may perform aspects of the functions discussed herein using special-purpose hardware.

At 1405, the UE may determine a MA signature to be applied to an uplink NOMA communication to a base station, where the MA signature is based on a UE-specific spreading code and a scrambling code associated with a first group of UEs. The operations of 1405 may be performed according to the methods described herein. In some examples, aspects of the operations of 1405 may be performed by a MA signature component as described with reference to FIGS. 6 through 9. In some cases, the UE-specific spreading code is one of a set of orthogonal UE-specific spreading codes, in which a cross-correlation between different UE-specific spreading codes is below a threshold value. In some cases, the UE-specific spreading code is one of a set of UE-specific spreading codes in which at least a subset of the UE-specific spreading codes are non-orthogonal to other UE-specific spreading codes.

At 1410, the UE may apply the MA signature to the uplink NOMA communication. The operations of 1410 may be performed according to the methods described herein. In some examples, aspects of the operations of 1410 may be performed by a NOMA signature manager as described with reference to FIGS. 6 through 9. In some cases, the UE may apply the MA signature to PUSCH data to be included with the uplink NOMA communication. In some cases, the UE may apply a demodulation reference signal (DMRS) signature to a DMRS to be included with the uplink NOMA communication, where the DMRS signature may include an orthogonal cover code (OCC) or quasi-orthogonal cover code and a group scrambling or short spreading code that are applied to a base DMRS sequence. In some cases, the MA signature applied to PUSCH data includes a short spreading code and a group-specific scrambling code, and where the short spreading code is jointly configured for both the PUSCH data and the base DMRS sequence. In some cases, a mapping between the MA signature and the DMRS signature is provided in MA signature configuration information provided by the base station.

At 1415, the UE may transmit the uplink NOMA communication to the base station. The operations of 1455 may be performed according to the methods described herein. In some examples, aspects of the operations of 1455 may be performed by a NOMA transmission manager as described with reference to FIGS. 6 through 9. In some cases, the uplink NOMA communication may use common time, frequency, and spatial resources as concurrent uplink NOMA communications of one or more other UEs.

Figure 15:
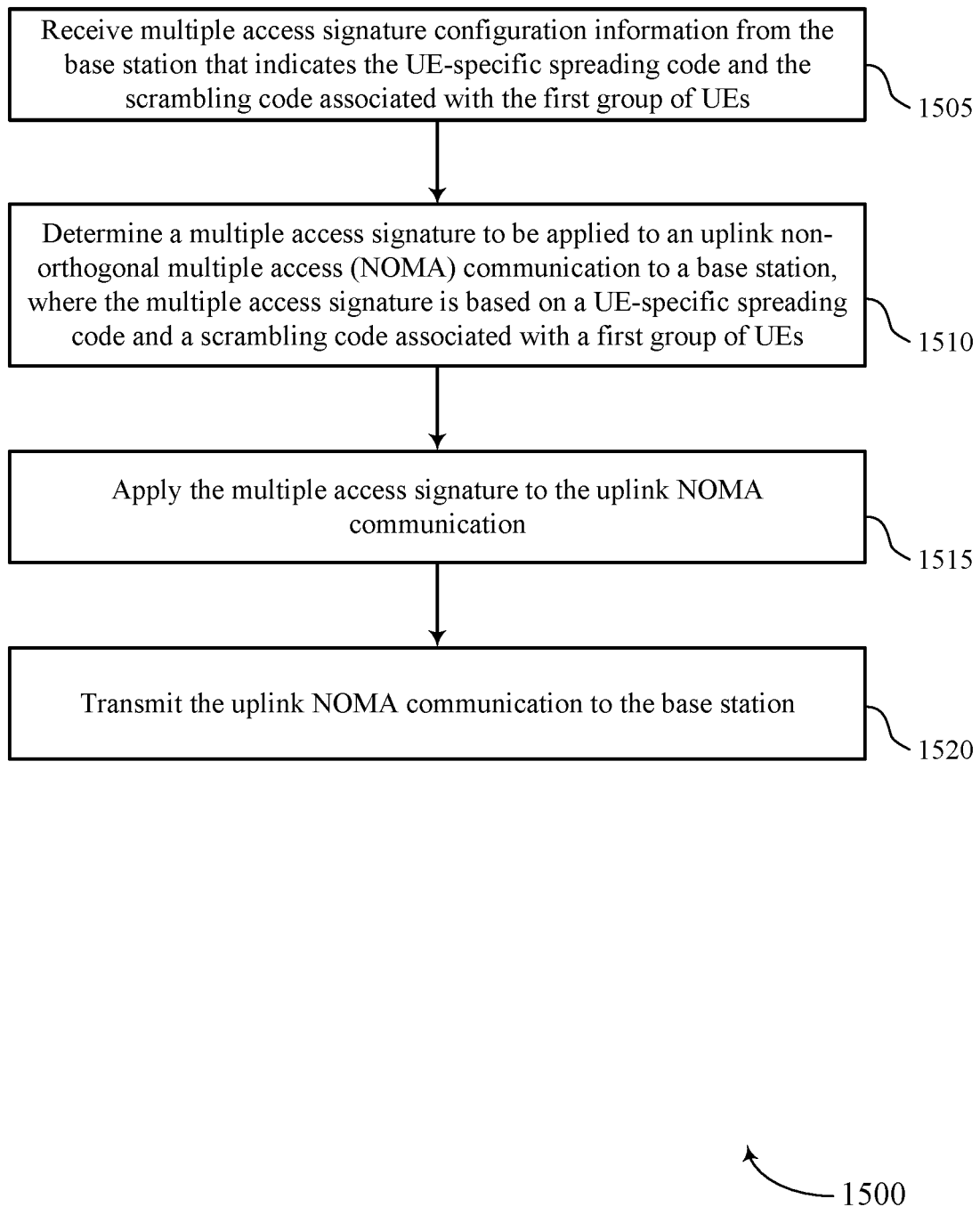

FIG. 15 shows a flowchart illustrating a method 1500 that supports MA signatures for NOMA wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions discussed herein. Additionally or alternatively, a UE may perform aspects of the functions discussed herein using special-purpose hardware.

At 1505, the UE may receive MA signature configuration information from the base station that indicates the UE-specific spreading code and the scrambling code associated with the first group of UEs. The operations of 1505 may be performed according to the methods described herein. In some examples, aspects of the operations of 1505 may be performed by a MA signature component as described with reference to FIGS. 6 through 9. In some cases, the MA signature configuration information is received from the base station in a master information block (MIB), in a SIB, in remaining minimum system information (RMSI), in a group common PDCCH, in RRC signaling, in dynamic DCI associated with the uplink NOMA communication, or any combination thereof.

At 1510, the UE may determine a MA signature to be applied to an uplink NOMA communication to a base station, where the MA signature is based on a UE-specific spreading code and a scrambling code associated with a first group of UEs. The operations of 1510 may be performed according to the methods described herein. In some examples, aspects of the operations of 1510 may be performed by a MA signature component as described with reference to FIGS. 6 through 9. In some cases, the MA signature may be jointly represented by a symbol-level short spreading code and a group specific scrambling code.

At 1515, the UE may apply the MA signature to the uplink NOMA communication. The operations of 1515 may be performed according to the methods described herein. In some examples, aspects of the operations of 1515 may be performed by a NOMA signature manager as described with reference to FIGS. 6 through 9. The MA signature may be applied, for example, by applying the symbol-level short spreading code and a group specific scrambling code to a NOMA signal on an symbol-by-symbol basis.

At 1520, the UE may transmit the uplink NOMA communication to the base station. The operations of 1520 may be performed according to the methods described herein. In some examples, aspects of the operations of 1520 may be performed by a NOMA transmission manager as described with reference to FIGS. 6 through 9.

Figure 16:
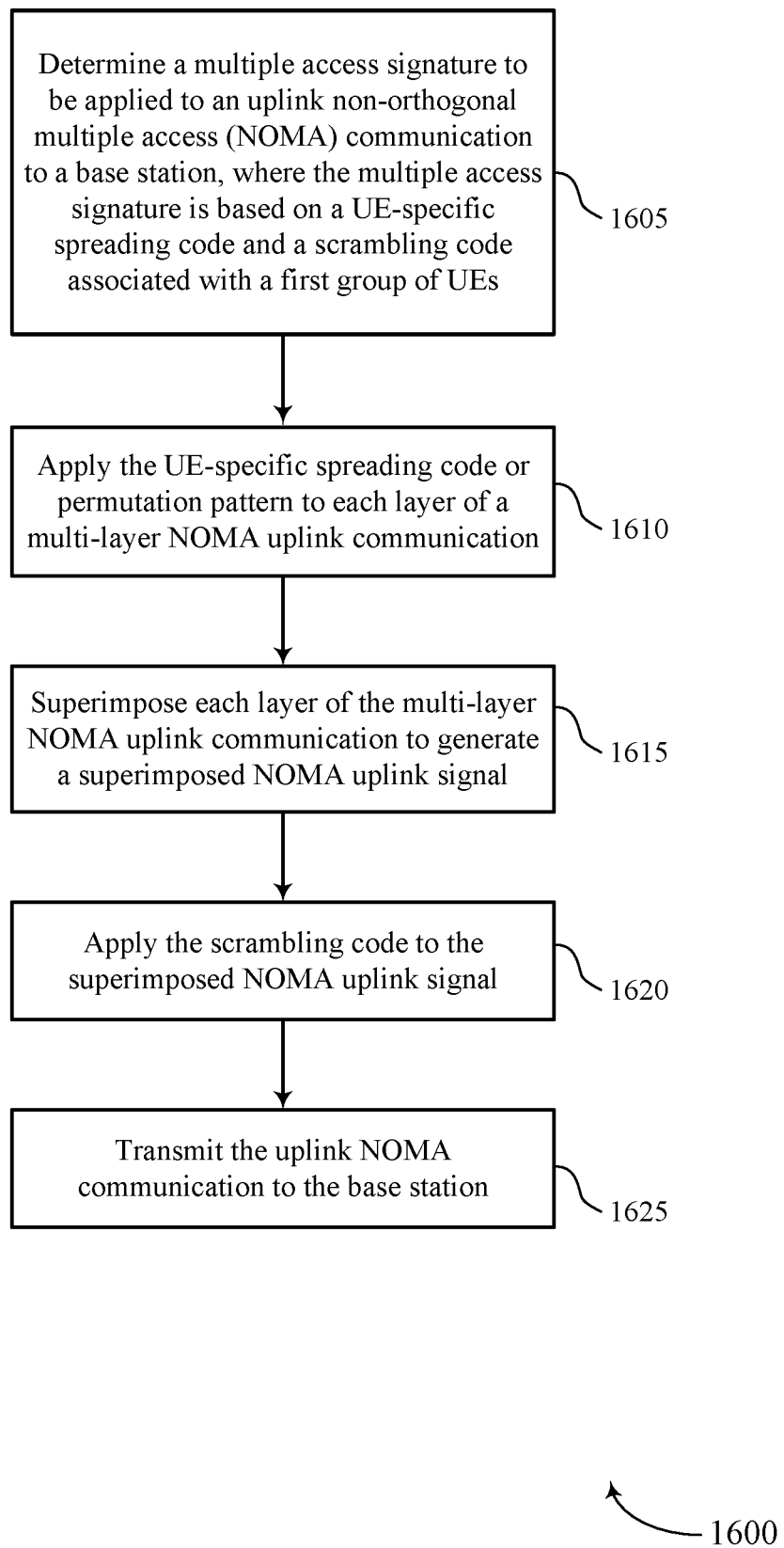

FIG. 16 shows a flowchart illustrating a method 1600 that supports MA signatures for NOMA wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions discussed herein. Additionally or alternatively, a UE may perform aspects of the functions discussed herein using special-purpose hardware.

At 1605, the UE may determine a MA signature to be applied to an uplink NOMA communication to a base station, where the MA signature is based on a UE-specific spreading code and a scrambling code associated with a first group of UEs. The operations of 1605 may be performed according to the methods described herein. In some examples, aspects of the operations of 1605 may be performed by a MA signature component as described with reference to FIGS. 6 through 9.

At 1610, the UE may apply the UE-specific spreading code or permutation pattern to each layer of a multi-layer NOMA uplink communication. The operations of 1610 may be performed according to the methods described herein. In some examples, aspects of the operations of 1610 may be performed by a NOMA signature manager as described with reference to FIGS. 6 through 9.

At 1615, the UE may superimpose each layer of the multi-layer NOMA uplink communication to generate a superimposed NOMA uplink signal. The operations of 1615 may be performed according to the methods described herein. In some examples, aspects of the operations of 1615 may be performed by a summing component as described with reference to FIGS. 6 through 9. The multiple layers may be superimposed by summing multiple concurrent portions of a NOMA signal, for example.

At 1620, the UE may apply the scrambling code to the superimposed NOMA uplink signal. The operations of 1620 may be performed according to the methods described herein. In some examples, aspects of the operations of 1620 may be performed by a scrambling component as described with reference to FIGS. 6 through 9.

At 1625, the UE may transmit the uplink NOMA communication to the base station. The operations of 1625 may be performed according to the methods described herein. In some examples, aspects of the operations of 1625 may be performed by a NOMA transmission manager as described with reference to FIGS. 6 through 9.

Figure 17:
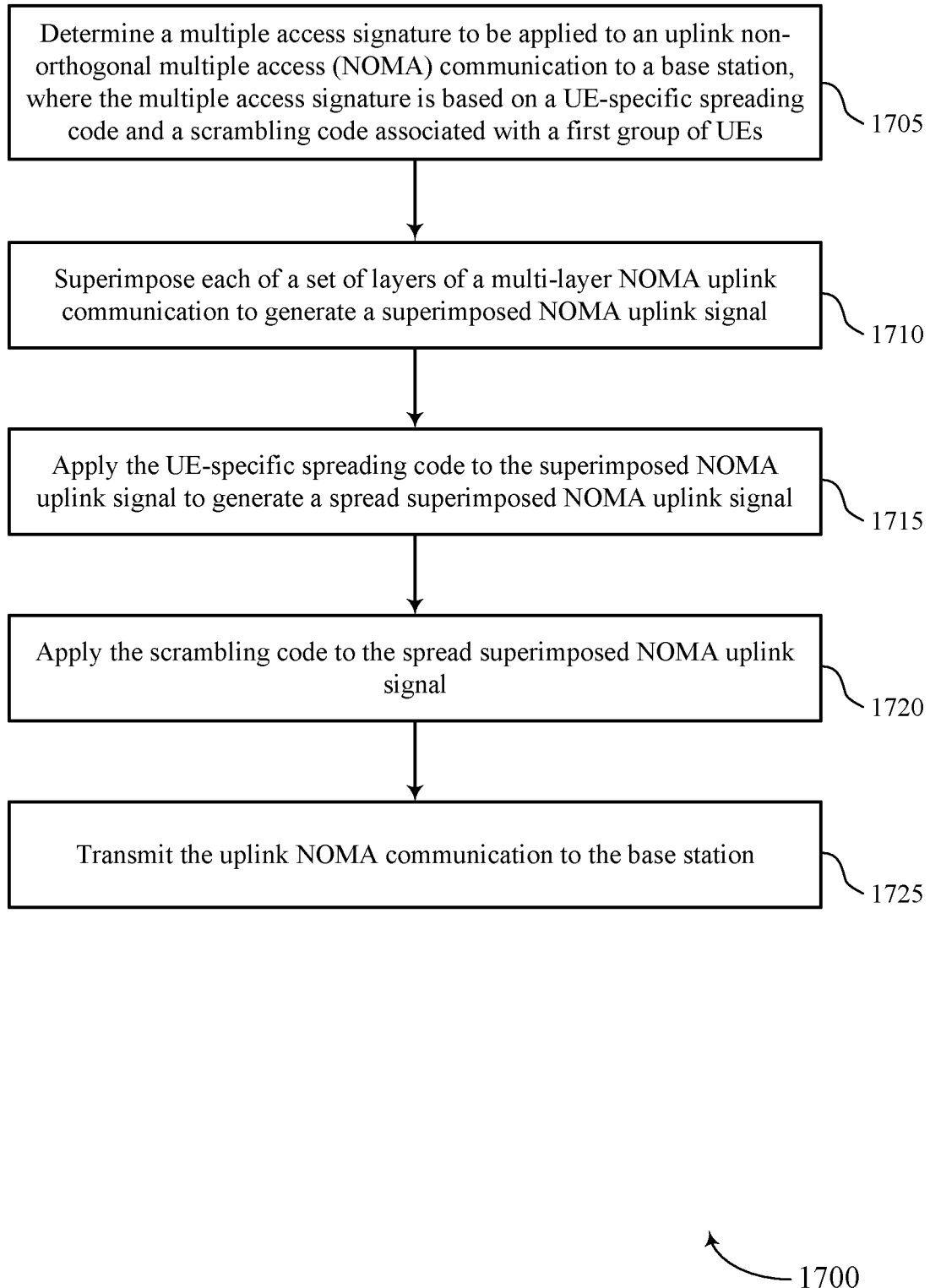

FIG. 17 shows a flowchart illustrating a method 1700 that supports MA signatures for NOMA wireless communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions discussed herein. Additionally or alternatively, a UE may perform aspects of the functions discussed herein using special-purpose hardware.

At 1705, the UE may determine a MA signature to be applied to an uplink NOMA communication to a base station, where the MA signature is based on a UE-specific spreading code and a scrambling code associated with a first group of UEs. The operations of 1705 may be performed according to the methods described herein. In some examples, aspects of the operations of 1705 may be performed by a MA signature component as described with reference to FIGS. 6 through 9.

At 1710, the UE may superimpose each of a set of layers of a multi-layer NOMA uplink communication to generate a superimposed NOMA uplink signal. The operations of 1710 may be performed according to the methods described herein. In some examples, aspects of the operations of 1715 may be performed by a summing component as described with reference to FIGS. 6 through 9. The multiple layers may be superimposed by summing multiple concurrent portions of a NOMA signal, for example.

At 1715, the UE may apply the UE-specific spreading code to the superimposed NOMA uplink signal to generate a spread superimposed NOMA uplink signal. The operations of 1715 may be performed according to the methods described herein. In some examples, aspects of the operations of 1715 may be performed by a spreading component as described with reference to FIGS. 6 through 9.

At 1720, the UE may apply the scrambling code to the spread superimposed NOMA uplink signal. The operations of 1720 may be performed according to the methods described herein. In some examples, aspects of the operations of 1720 may be performed by a scrambling component as described with reference to FIGS. 6 through 9.

At 1725, the UE may transmit the uplink NOMA communication to the base station. The operations of 1725 may be performed according to the methods described herein. In some examples, aspects of the operations of 1725 may be performed by a NOMA transmission manager as described with reference to FIGS. 6 through 9.

Figure 18:
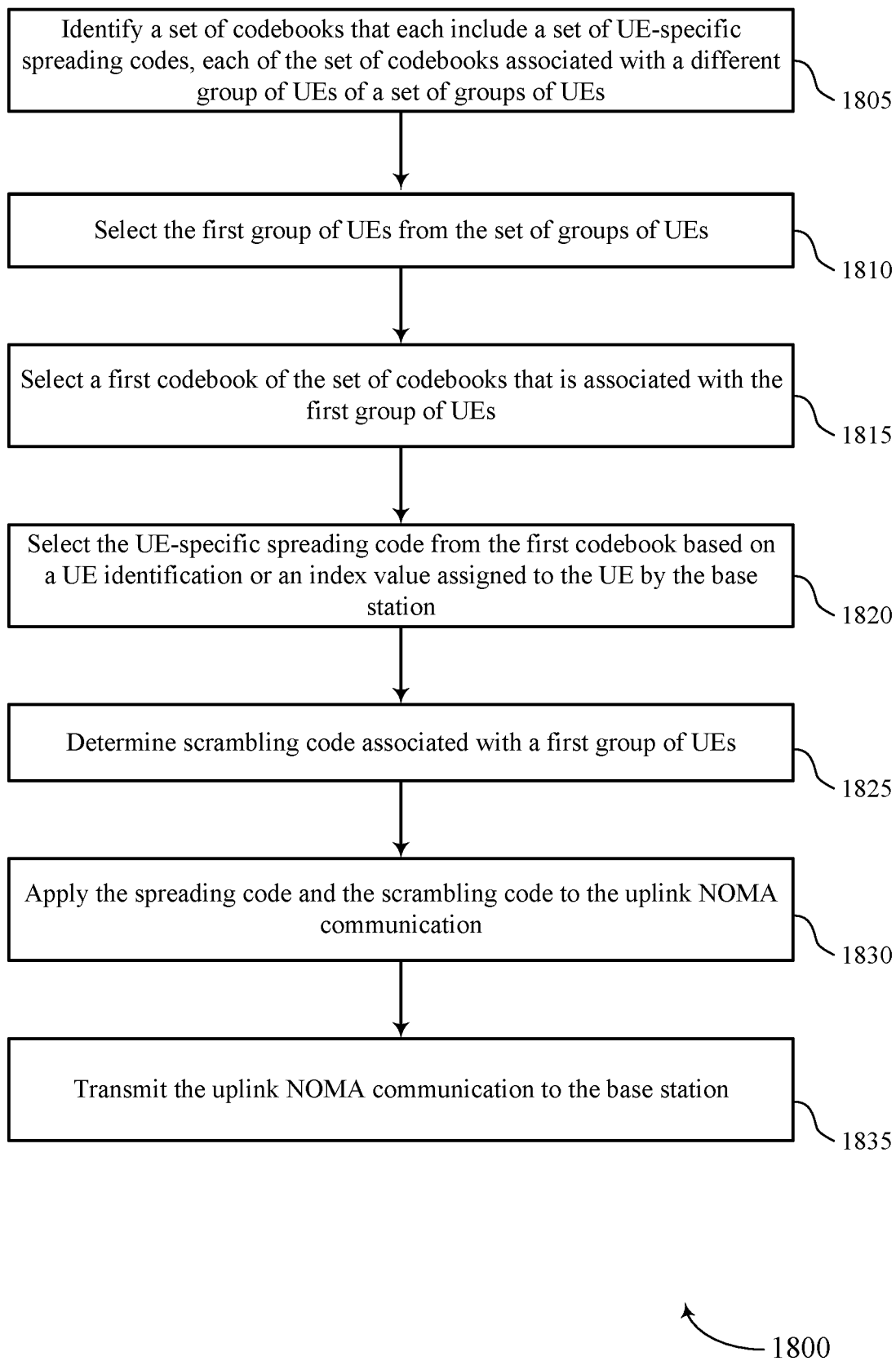

FIG. 18 shows a flowchart illustrating a method 1800 that supports MA signatures for NOMA wireless communications in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions discussed herein. Additionally or alternatively, a UE may perform aspects of the functions discussed herein using special-purpose hardware.

At 1805, the UE may identify a set of codebooks that each include a set of UE-specific spreading codes, each of the set of codebooks associated with a different group of UEs of a set of groups of UEs. The operations of 1805 may be performed according to the methods described herein. In some examples, aspects of the operations of 1805 may be performed by a MA signature component as described with reference to FIGS. 6 through 9.

At 1810, the UE may select the first group of UEs from the set of groups of UEs based on one or more of an amount of data to be transmitted in the uplink NOMA communication, a transmission power for the uplink NOMA communication, a spreading factor to be used for the UE-specific spreading codes, or a modulation and coding scheme (MCS) to be used for the uplink NOMA communication. The operations of 1810 may be performed according to the methods described herein. In some examples, aspects of the operations of 1810 may be performed by a MA signature component as described with reference to FIGS. 6 through 9.

At 1815, the UE may select a first codebook of the set of codebooks that is associated with the first group of UEs. The operations of 1815 may be performed according to the methods described herein. In some examples, aspects of the operations of 1815 may be performed by a MA signature component as described with reference to FIGS. 6 through 9.

At 1820, the UE may select the UE-specific spreading code from the first codebook based on a UE identification or an index value assigned to the UE by the base station. The operations of 1820 may be performed according to the methods described herein. In some examples, aspects of the operations of 1820 may be performed by a MA signature component as described with reference to FIGS. 6 through 9. In some cases, the set of UE-specific spreading codes of each of the set of codebooks include modified chirp sequences (MCPs), computer generated sequences (CGSs), pseudo-random noise (PN) sequences, or combinations thereof.

At 1825, the UE may determine a scrambling code associated with a first group of UEs. The operations of 1825 may be performed according to the methods described herein. In some examples, aspects of the operations of 1825 may be performed by a MA signature component as described with reference to FIGS. 6 through 9. In some cases, the scrambling code may be determined based on the selected first group of UEs. In some cases, a codebook may be used to determine the scrambling code for the first group of UEs.

At 1830, the UE may apply the spreading code and the scrambling code to the uplink NOMA communication. The operations of 1830 may be performed according to the methods described herein. In some examples, aspects of the operations of 1830 may be performed by a NOMA signature manager as described with reference to FIGS. 6 through 9.

At 1835, the UE may transmit the uplink NOMA communication to the base station. The operations of 1835 may be performed according to the methods described herein. In some examples, aspects of the operations of 1835 may be performed by a NOMA transmission manager as described with reference to FIGS. 6 through 9.

Figure 19:
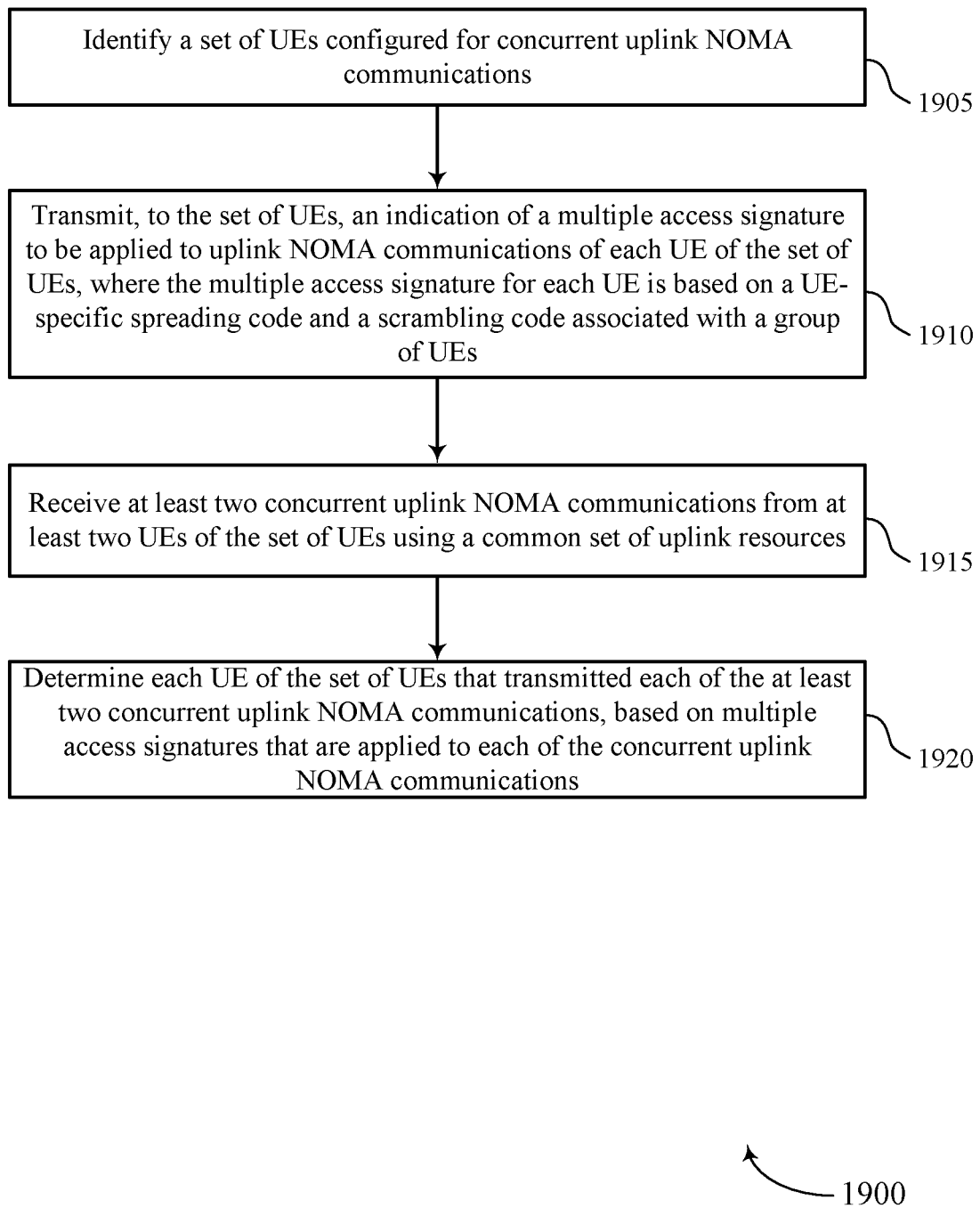

FIG. 19 shows a flowchart illustrating a method 1900 that supports MA signatures for NOMA wireless communications in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions discussed herein. Additionally or alternatively, a base station may perform aspects of the functions discussed herein using special-purpose hardware.

At 1905, the base station may identify a set of UEs configured for concurrent uplink NOMA communications. The operations of 1905 may be performed according to the methods described herein. In some examples, aspects of the operations of 1905 may be performed by a NOMA transmission manager as described with reference to FIGS. 10 through 13. In some cases, the set of UEs may be identified based on a UE class, a UE category, or an indication of the UE that NOMA data is to be transmitted, for example.

At 1910, the base station may transmit, to the set of UEs, an indication of a MA signature to be applied to uplink NOMA communications of each UE of the set of UEs, where the MA signature for each UE is based on a UE-specific spreading code and a scrambling code associated with a group of UEs. The operations of 1910 may be performed according to the methods described herein. In some examples, aspects of the operations of 1910 may be performed by a MA signature component as described with reference to FIGS. 10 through 13. In some cases, the UE-specific spreading code of each UE of the set of UEs is one of a set of orthogonal UE-specific spreading codes associated with each of a set of groups of UEs, in which a cross-correlation between different UE-specific spreading codes of the set of orthogonal UE-specific spreading codes is below a threshold value. In some cases, the UE-specific spreading code of each UE of the set of UEs is one of a set of UE-specific spreading codes in which at least a subset of the UE-specific spreading codes are non-orthogonal to other UE-specific spreading codes. In some cases, the indication of the MA signature to be applied to uplink NOMA communications of each UE of the set of UEs is transmitted in a master information block (MIB), in a SIB, in remaining minimum system information (RMSI), in a group common PDCCH, in RRC signaling to each of the set of UEs, in dynamic DCI signaling to each of the set of UEs, or any combination thereof. In some cases, the MA signatures that are applied to each of the concurrent uplink NOMA communications are applied to PUSCH data included with the uplink NOMA communication, and where a demodulation reference signal (DMRS) signature is applied to a DMRS that is transmitted with the uplink NOMA communication.

At 1915, the base station may receive at least two concurrent uplink NOMA communications from at least two UEs of the set of UEs using a common set of uplink resources. The operations of 1915 may be performed according to the methods described herein. In some examples, aspects of the operations of 1915 may be performed by a NOMA reception manager as described with reference to FIGS. 10 through 13.

At 1920, the base station may determine each UE of the set of UEs that transmitted each of the at least two concurrent uplink NOMA communications, based on MA signatures that are applied to each of the concurrent uplink NOMA communications. The operations of 1920 may be performed according to the methods described herein. In some examples, aspects of the operations of 1920 may be performed by a MA signature component as described with reference to FIGS. 10 through 13. In some cases, the base station may use a MUD and SIC to decode each concurrent uplink NOMA communications, and use a MA signature of each uplink NOMA communication to determine a UE that is associated with the communication.

Figure 20:
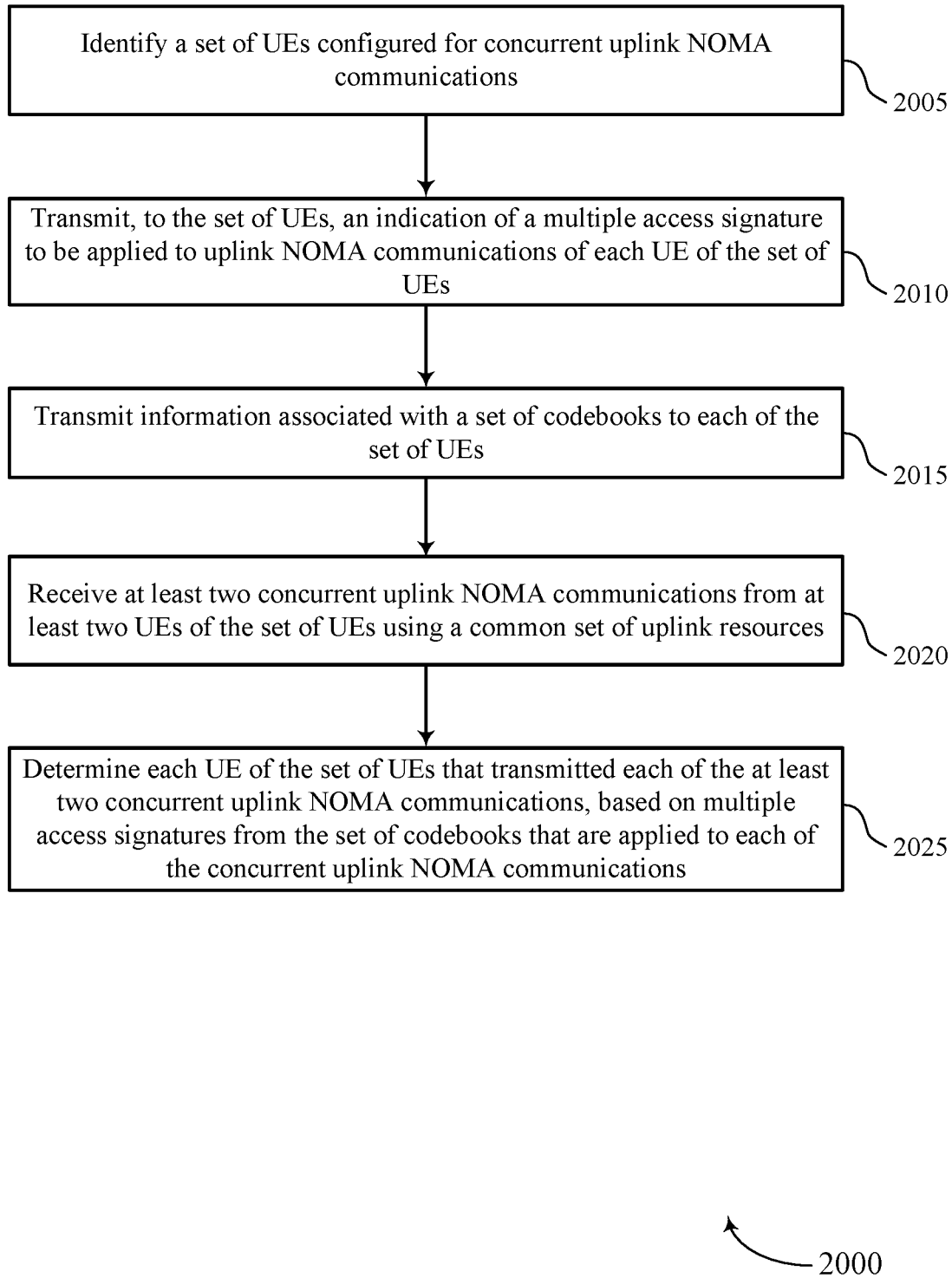

FIG. 20 shows a flowchart illustrating a method 2000 that supports MA signatures for NOMA wireless communications in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions discussed herein. Additionally or alternatively, a base station may perform aspects of the functions discussed herein using special-purpose hardware.

At 2005, the base station may identify a set of UEs configured for concurrent uplink NOMA communications. The operations of 2005 may be performed according to the methods described herein. In some examples, aspects of the operations of 2005 may be performed by a NOMA transmission manager as described with reference to FIGS. 10 through 13. In some cases, the set of UEs may be identified based on a UE class, a UE category, or an indication of the UE that NOMA data is to be transmitted, for example.

At 2010, the base station may transmit, to the set of UEs, an indication of a MA signature to be applied to uplink NOMA communications of each UE of the set of UEs, where the MA signature for each UE is based on a UE-specific spreading code and a scrambling code associated with a group of UEs. The operations of 2010 may be performed according to the methods described herein. In some examples, aspects of the operations of 2010 may be performed by a MA signature component as described with reference to FIGS. 10 through 13. In some cases, the indication of the MA signature to be applied to uplink NOMA communications of each UE of the set of UEs is transmitted in a master information block (MIB), in a SIB, in remaining minimum system information (RMSI), in a group common PDCCH, in RRC signaling to each of the set of UEs, in dynamic DCI signaling to each of the set of UEs, or any combination thereof. In some cases, the MA signatures that are applied to each of the concurrent uplink NOMA communications are applied to PUSCH data included with the uplink NOMA communication, and where a demodulation reference signal (DMRS) signature is applied to a DMRS that is transmitted with the uplink NOMA communication.

At 2015, the base station may transmit information associated with a set of codebooks to each of the set of UEs, where each of the set of codebooks include a set of UE-specific spreading codes, and each of the set of codebooks are associated with one or more of an amount of data to be transmitted by a UE in an associated uplink NOMA communication, a transmission power of the UE, a spreading factor to be used for the UE-specific spreading codes, or a modulation and coding scheme (MCS) to be used by the UE. The operations of 2015 may be performed according to the methods described herein. In some examples, aspects of the operations of 2015 may be performed by a configuration manager as described with reference to FIGS. 10 through 13. In some cases, the base station may the set of UE-specific spreading codes of each of the set of codebooks include modified chirp sequences (MCPs), computer generated sequences (CGSs), pseudo-random noise (PN) sequences, or combinations thereof.

At 2020, the base station may receive at least two concurrent uplink NOMA communications from at least two UEs of the set of UEs using a common set of uplink resources. The operations of 2020 may be performed according to the methods described herein. In some examples, aspects of the operations of 2020 may be performed by a NOMA reception manager as described with reference to FIGS. 10 through 13.

At 2025, the base station may determine each UE of the set of UEs that transmitted each of the at least two concurrent uplink NOMA communications, based on MA signatures that are applied to each of the concurrent uplink NOMA communications. The operations of 2025 may be performed according to the methods described herein. In some examples, aspects of the operations of 2025 may be performed by a MA signature component as described with reference to FIGS. 10 through 13. In some cases, the base station may use a MUD and SIC to decode each concurrent uplink NOMA communications, and use a MA signature of each uplink NOMA communication to determine a UE that is associated with the communication.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining a multiple access signature to be applied to an uplink non-orthogonal multiple access (NOMA) communication to a base station, wherein the multiple access signature is based at least in part on a UE-specific spreading code and a scrambling code associated with a group of UEs from a set of UE groups associated with the base station;
    applying the multiple access signature to a DMRS to be included with the uplink NOMA communication, wherein the applying the multiple access signature to the uplink NOMA communication comprises applying a demodulation reference signal (DMRS) signature to a DMRS to be included with the uplink NOMA communication, the DMRS signature comprising an orthogonal cover code (OCC) or quasi-orthogonal cover code and a group scrambling or short spreading code that are applied to a base DMRS sequence; and
    transmitting the uplink NOMA communication to the base station.

2. The method of claim 1, wherein a mapping between the multiple access signature and the DMRS signature is provided in multiple access signature configuration information provided by the base station.

3. The method of claim 1, further comprising:
    receiving multiple access signature configuration information from the base station that indicates the UE-specific spreading code and the scrambling code associated with the group of UEs.

4. The method of claim 3, wherein the multiple access signature configuration information is received from the base station in a master information block (MIB), in a system information block (SIB), in remaining minimum system information (RMSI), in a group common PDCCH, in radio resource control (RRC) signaling, in dynamic downlink control information (DCI) associated with the uplink NOMA communication, or any combination thereof.

5. The method of claim 1, wherein the UE-specific spreading code is one of a plurality of orthogonal UE-specific spreading codes.

6. The method of claim 1, wherein the UE-specific spreading code is one of a plurality of UE-specific spreading codes in which at least a subset of the UE-specific spreading codes are non-orthogonal to other UE-specific spreading codes of the plurality of UE-specific spreading codes.

7. A method for wireless communication at a user equipment (UE), comprising:
    determining a multiple access signature to be applied to an uplink non-orthogonal multiple access (NOMA) communication to a base station, wherein the multiple access signature is based at least in part on a UE-specific spreading code and a scrambling code associated with a group of UEs;
    applying the multiple access signature to the uplink NOMA communication; and
    transmitting the uplink NOMA communication to the base station, wherein the applying comprises:
        applying the UE-specific spreading code, or a permutation pattern thereof, to each layer of a multi-layer NOMA uplink communication;
        superimposing each layer of the multi-layer NOMA uplink communication to generate a superimposed NOMA uplink signal; and
        applying the scrambling code to the superimposed NOMA uplink signal.

8. A method for wireless communication at a user equipment (UE), comprising:
    determining a multiple access signature to be applied to an uplink non-orthogonal multiple access (NOMA) communication to a base station, wherein the multiple access signature is based at least in part on a UE-specific spreading code and a scrambling code associated with a group of UEs;
    applying the multiple access signature to the uplink NOMA communication; and
    transmitting the uplink NOMA communication to the base station,
    wherein the applying comprises:
        superimposing each of a plurality of layers of a multi-layer NOMA uplink communication to generate a superimposed NOMA uplink signal;
        applying the UE-specific spreading code to the superimposed NOMA uplink signal to generate a spread superimposed NOMA uplink signal; and
        applying the scrambling code to the spread superimposed NOMA uplink signal.

9. The method of claim 1, further comprising: A method for wireless communication at a user equipment (UE), comprising:
    determining a multiple access signature to be applied to an uplink non-orthogonal multiple access (NOMA) communication to a base station, wherein the multiple access signature is based at least in part on a UE-specific spreading code and a scrambling code associated with a group of UEs;
    applying the multiple access signature to the uplink NOMA communication;
    identifying a plurality of codebooks that each include a plurality of UE-specific spreading codes, each of the plurality of codebooks associated with a different group of UEs of a plurality of groups of UEs;
    selecting the group of UEs from the plurality of groups of UEs based at least in part on one or more of an amount of data to be transmitted in the uplink NOMA communication, a transmission power for the uplink NOMA communication, a spreading factor to be used for the UE-specific spreading codes, or a modulation and coding scheme (MCS) to be used for the uplink NOMA communication; and
selecting a first codebook of the plurality of codebooks that is associated with the group of UEs;
transmitting the uplink NOMA communication to the base station.

10. The method of claim 9, further comprising:
selecting the UE-specific spreading code from the first codebook based at least in part on a UE identification or an index value assigned to the UE by the base station.

11. A method for wireless communication at a base station, comprising:
identifying a plurality of user equipments (UEs) configured for concurrent uplink non-orthogonal multiple access (NOMA) communications;
transmitting, to the plurality of UEs, an indication of a multiple access signature to be applied to uplink NOMA communications of each UE of the plurality of UEs, wherein the multiple access signature for each UE is based at least in part on a UE-specific spreading code and a scrambling code associated with a group of UEs;
receiving at least two concurrent uplink NOMA communications from at least two UEs of the plurality of UEs using a common set of uplink resources; and
determining each UE of the plurality of UEs that transmitted each of the at least two concurrent uplink NOMA communications, based at least in part on multiple access signatures that are applied to each of the concurrent uplink NOMA communications;
wherein a demodulation reference signal (DMRS) signature is applied to a DMRS that is transmitted with the uplink NOMA communication and the DMRS signature comprises an orthogonal cover code (OCC) or quasi-orthogonal cover code and a group scrambling or short spreading code that is applied to a base DMRS sequence.

12. The method of claim 11, wherein a mapping between the multiple access signature and the DMRS signature is provided in multiple access signature configuration information.

13. The method of claim 11, wherein the indication of the multiple access signature to be applied to uplink NOMA communications of each UE of the plurality of UEs is transmitted in a master information block (MIB), in a system information block (SIB), in remaining minimum system information (RMSI), in a group common PDCCH, in radio resource control (RRC) signaling to each of the plurality of UEs, in dynamic downlink control information (DCI) signaling to each of the plurality of UEs, or any combination thereof.

14. The method of claim 11, wherein the UE-specific spreading code of each UE of the plurality of UEs is one of a plurality of orthogonal UE-specific spreading codes associated with each of a plurality of groups of UEs.

15. The method of claim 11, wherein the UE-specific spreading code of each UE of the plurality of UEs is one of a plurality of UE-specific spreading codes in which at least a subset of the UE-specific spreading codes are non-orthogonal to other UE-specific spreading codes of the plurality of UE-specific spreading codes.

16. The method of claim 11, further comprising:
transmitting information associated with a plurality of codebooks to each of the plurality of UEs, wherein each of the plurality of codebooks include a plurality of UE-specific spreading codes, and each of the plurality of codebooks are associated with one or more of an amount of data to be transmitted by a UE in an associated uplink NOMA communication, a transmission power of the UE, a spreading factor to be used for the UE-specific spreading codes, or a modulation and coding scheme (MCS) to be used by the UE.

17. An apparatus for wireless communication at a user equipment (UE), comprising:
a processor,
memory in electronic communication with the processor; and
instructions stored in the memory and executable by the processor to cause the apparatus to:
determine a multiple access signature to be applied to an uplink non-orthogonal multiple access (NOMA) communication to a base station, wherein the multiple access signature is based at least in part on a UE-specific spreading code and a scrambling code associated with a group of UEs, wherein the group of UE is one of a plurality of UE groups associated with the base station;
apply the multiple access signature to a DMRS to be included with the uplink NOMA communication, wherein the applying the multiple access signature to the uplink NOMA communication comprises applying a demodulation reference signal (DMRS) signature to a DMRS to be included with the uplink NOMA communication, the DMRS signature comprising an orthogonal cover code (OCC) or quasi-orthogonal cover code and a group scrambling or short spreading code that are applied to a base DMRS sequence; and
transmit the uplink NOMA communication to the base station.

18. An apparatus for wireless communication at a base station, comprising:
a processor,
memory in electronic communication with the processor; and
instructions stored in the memory and executable by the processor to cause the apparatus to:
identify a plurality of user equipments (UEs) configured for concurrent uplink non-orthogonal multiple access (NOMA) communications;
transmit, to the plurality of UEs, an indication of a multiple access signature to be applied to uplink NOMA communications of each UE of the plurality of UEs, wherein the multiple access signature for each UE is based at least in part on a UE-specific spreading code and a scrambling code associated with a group of UEs;
receive at least two concurrent uplink NOMA communications from at least two UEs of the plurality of UEs using a common set of uplink resources; and
determine each UE of the plurality of UEs that transmitted each of the at least two concurrent uplink NOMA communications, based at least in part on multiple access signatures that are applied to each of the concurrent uplink NOMA communications;
wherein a demodulation reference signal (DMRS) signature is applied to a DMRS that is transmitted with the uplink NOMA communication and the DMRS signature comprises an orthogonal cover code (OCC) or quasi-orthogonal cover code and a group scrambling or short spreading code that is applied to a base DMRS sequence.

19. An apparatus for wireless communication at a user equipment (UE), comprising:

means for determining a multiple access signature to be applied to an uplink non- orthogonal multiple access (NOMA) communication to a base station, wherein the multiple access signature is based at least in part on a UE-specific spreading code and a scrambling code associated with a group of UEs;

means for applying the multiple access signature to a DMRS to be included with the uplink NOMA communication, wherein the means for applying applies a demodulation reference signal (DMRS) signature to a DMRS to be included with the uplink NOMA communication, the DMRS signature comprising an orthogonal cover code (OCC) or quasi-orthogonal cover code and a group scrambling or short spreading code that are applied to a base DMRS sequence; and means for transmitting the uplink NOMA communication to the base station.

20. An apparatus for wireless communication at a base station, comprising:

means for identifying a plurality of user equipments (UEs) configured for concurrent uplink non-orthogonal multiple access (NOMA) communications;

means for transmitting, to the plurality of UEs, an indication of a multiple access signature to be applied to uplink NOMA communications of each UE of the plurality of UEs, wherein the multiple access signature for each UE is based at least in part on a UE-specific spreading code and a scrambling code associated with a group of UEs;

means for receiving at least two concurrent uplink NOMA communications from at least two UEs of the plurality of UEs using a common set of uplink resources; and means for determining each UE of the plurality of UEs that transmitted each of the at least two concurrent uplink NOMA communications, based at least in part on multiple access signatures that are applied to each of the concurrent uplink NOMA communications;

wherein a demodulation reference signal (DMRS) signature is applied to a DMRS that is transmitted with the uplink NOMA communication and the DMRS signature comprises an orthogonal cover code (OCC) or quasi-orthogonal cover code and a group scrambling or short spreading code that is applied to a base DMRS sequence.

* * * * *